United States Patent
White et al.

(10) Patent No.: US 6,618,732 B1
(45) Date of Patent: Sep. 9, 2003

(54) DATABASE QUERY HANDLER SUPPORTING QUERYING OF TEXTUAL ANNOTATIONS OF RELATIONS BETWEEN DATA OBJECTS

(75) Inventors: Jason S. White, Concord, MA (US); Rebecca L. Hall, Somerville, MA (US); Harold H. Engstrom, Lincoln, MA (US)

(73) Assignee: Revelink, Inc., Acton, MA (US)

( * ) Notice: Subject to any disclaimer, the term of this patent is extended or adjusted under 35 U.S.C. 154(b) by 0 days.

(21) Appl. No.: 09/712,810

(22) Filed: Nov. 14, 2000

Related U.S. Application Data

(60) Provisional application No. 60/196,533, filed on Apr. 11, 2000.

(51) Int. Cl.[7] ............................................. G06F 17/30
(52) U.S. Cl. ................................................... 707/103
(58) Field of Search ................................. 707/101–103

(56) References Cited

U.S. PATENT DOCUMENTS

| | | | |
|---|---|---|---|
| 5,206,951 A | 4/1993 | Khoyi et al. ................ 709/315 |
| 5,499,371 A | 3/1996 | Henninger et al. ............ 707/1 |
| 5,634,124 A | 5/1997 | Khoyi et al. ................ 707/103 |
| 5,809,297 A | 9/1998 | Kroenke et al. ............ 707/102 |
| 5,819,086 A | 10/1998 | Kroenke ..................... 707/102 |
| 5,872,973 A | * | 2/1999 | Mitchell et al. ............ 709/332 |
| 5,930,783 A | * | 7/1999 | Li et al. ........................ 707/1 |
| 6,499,021 B1 | * | 12/2002 | Abu-Hakima ................ 706/10 |

OTHER PUBLICATIONS

Introduction to Structured Query Language, Version 4.76, pp. 1–33, available at http:/w3.one.net/~jhoffmann/sql-tut.htm.

Sentences by Michael Thompson, Lazy Software Ltd., Apr. 2000, p. 1–7.

(List continued on next page.)

*Primary Examiner*—Jack Choules
(74) *Attorney, Agent, or Firm*—Jay P. Sbrollini

(57) ABSTRACT

An improved command handler (and database system utilizing the improved command handler) interfaces to a datastore storing item data for a plurality of items and bi-directional modifier data, corresponding to a relation between at least one first item and at least one second item, that represents first text characterizing semantics of a relationship of the at least one first item to the at least one second item, and represents second text characterizing semantics of a relationship of the at least one second item to the at least one first item. The command handler operates, in response to receiving a first-type query command that specifies at least one given item, to access the datastore to identify i) at least one related item that is related to the given item, and identify ii) either the first text or the second text characterizing semantics of the relation between the given item and the at least one related item. The command hander returns i) data corresponding to the at least one related item; and ii) data corresponding to the identified first text and or second text characterizing semantics of the relation between the given item and the at least one related item. Preferably, the data returned in response to the first-type query command identifies the at least one related item. and identifies the first text or second text characterizing semantics of the relation between the given item and the at least one related item. In addition, the command handler preferably supports additional commands that retrieve from the datastore information related to specified objects, object types, and relations.

The command handler (and database system) of the present invention may be used in a wide assortment of software applications, including enterprise applications (such as e-business applications, supply chain management applications, customer relationship management applications, decision support applications), the file system in operating systems, web browsers, e-mail applications and personal information management applications. Importantly, the command handler (and database system) provides an efficient mechanism to query the organization of the data elements (and the relationships therebetween) stored and accessed in such software applications, in a manner that efficient and readily adaptable to client-server database systems or other distributed database systems.

26 Claims, 15 Drawing Sheets

OTHER PUBLICATIONS

Dynamic Relationships in Object Oriented Databases: A Uniform Approach by Awais Rashid, Peter Sawyer, Proceedings of the 10th International Conference on Database and Expert Systems Applications DEXA 99, Lecture Notes in Computer Science, vol. 1677 Springer, 1999, p. 26–35.

Relational Database Design Clearly Explained by Jan L. Harrington, Morgan Kaufman, Oct. 1998, p. V–XII, 1–62.

Object Database vs. Object–Relational Databases by Steve McClure, International Data Corporation, Bulletin # 1482E, Aug. 1997, pp. 1–18, available at www.cai.com/products/jasmine/analyst/idc/146821E.htm.

Architecting Object Applications for High Performance With Relational Databases by Shailesh Agarwal, Christopher Keene, Arthur M. Keller, High Performance Object/Relational Applications, position paper presented at OOPSLA '95 workshop on Object Database Behavior Benchmarks and Performance, Oct. 1995, pp. 1–8, available at www.cs.colorado.edu/~zorn/oopsla95/papers.html.

Automated Documentation for Rational Rose Using SoDA by, Rational Softw are Corporation, Cupertino CA, 1994, available from www.rational.com/products/whitepaper/345.jsp.

Waxing Semantic: Wall Data Inc Chief Technologist David M. Kroeneke, Creator of the Semantic Object Modeling Approach to Application Development, by David M. Kalman, DBMS Interview, Sep. 1994, pp. 1–9, available at http://www.dbmsmag.com/int9409.html.

An ORM Metamodel by Dr. Terry Halpin, The Journal of Conceptual Modeling, Oct. 2000, p. 1–8.

Modeling, Data Semantics, and Natural Language by Ken North, Jul. 1999, Web Techniques, p. 1–8, available at www.webtechniques.com/archives/1999/07/data/.

* cited by examiner

DATABASE QUERY HANDLER SUPPORTING QUERYING OF TEXTUAL ANNOTATIONS OF RELATIONS BETWEEN DATA OBJECTS

RELATED CASES

This Application is a Continuation-in-Part of Provisional U.S. Patent Application No. 60/196,533 entitled "OBJECT ORIENTED DATA MANAGEMENT AND PROCESS CONTROL SYSTEM" filed Apr. 11, 2000, by Jason S. White, et al., and incorporated herein by reference in its entirety.

BACKGROUND OF THE INVENTION

1. Technical Field

The present invention relates to database systems, and, more specifically, to software frameworks that store and operate on data stored in a database.

2. Related Art

A database (or data container) comprises one or more files composed of records that store information together with a set of operations for creating/updating and accessing the information stored therein. Databases are used in a wide assortment of software applications. For example, enterprise applications (such as e-business applications, supply chain management applications, customer relationship management applications, decision support applications) access and operate on data organized and stored in one or more databases. In another example, the file system in modem operating systems (such as Microsoft Windows, MacOS and the Unix-based operating systems) utilize a directory database (e.g., folder database) to organize and store files. In yet another example, web browsers, e-mail applications and personal information management applications utilize a folder database to organize and store information, such as web page bookmarks/favorites, e-mail messages and contact information, respectively.

When a software application accesses and stores large amounts of data, a relational database management system (RDBMS) is typically used to minimize the storage requirements and the overhead in updating the data elements stored therein. A more detailed description of database systems may be found in C.J. Date, "An Introduction to Database Systems," Addison-Wesley, 7$^{th}$ Ed., 2000, herein incorporated by reference in its entirety.

The difficulty in using database systems is defining (and understanding) the organization of the data elements stored therein and the semantics of the relationships between such data elements. For example, in RDBMS systems, a logical schema (consisting of tables, columns and keys) defines the organization of the data elements (and the relationships therebetween) of the database. In such a database system, in order to create (and/or maintain) a database, a user must become familiar with tables, columns, and keys (and the rules and user interface related thereto) used to define the database schema, or hire an expert database designer to play this role. This may be a time-consuming process that delays development of the software application under development and/or may increase development/maintenance costs of such software.

Moreover, the semantics of the relationships between data elements of a database is information that is essential to efficiently and effectively designing and maintaining such a database. Yet, modem database systems fail to capture and record this information in a way useful to those who are in a position to understand the real-word meaning of this information.

U.S. Pat. No. 5,809,297 to Kroenke et al. discloses a system for creating a database schema using semantic objects (i.e., objects that include a plurality of attributes including an object linking attribute that defines a relationship between two or more semantic objects). In the system of Kroenke, a user creates (and updates) a view window of the attributes of objects to define the relationships between objects. This view window includes the attributes of an object intermingled with information describing the semantics of the relationship of the object with another object(s). Importantly, the intermingling of attributes of an object together with such semantic information fails to effectively convey the semantic information to the user.

Thus, there is a great need to provide a mechanism that enables a user to view (and define, update, store and query) the semantics of a relationship between objects in a manner that effectively conveys the semantics of such relationships, thereby enabling users to efficiently and effectively design and maintain databases and also understand the organization of data elements in such databases.

SUMMARY OF THE INVENTION

Accordingly, a prime object of the present invention is to provide improved methods and apparatus (and database system) enabling users to define, update, store, query, and view the semantics of a relationship between data objects in a manner that effectively conveys the semantics of such relationships.

It is another object to provide improved methods and apparatus (and database systems) that enable a user to define, update, store, query and view the semantics of a relationship between types of data objects in a manner that effectively conveys the semantics of such relationships.

It is another object of the present invention to provide users with the ability to specify arbitrary text strings to represent the semantics of the relationships between objects and object types.

It is another object to enable the text strings that represent the semantics of the relationships between objects and object types to be separate from (and indirectly coupled to) the objects/object types of a given relation to enable the text strings to characterize the semantics of multiple relationships (thus saving storage spaces) and to enable the text strings to characterize the semantics of relationships of objects in disparate systems (for example, two different databases).

It is a further object of the present invention to provide a view navigation mechanism, in conjunction with a database storing text representing the semantics of a relationship between data objects and object types, that interacts with a user to effectively convey to the user the relationships between data objects and data types stored therein.

It is a further object of the present invention to provide a query handler, operating in conjunction with a database storing text representing the semantics of a relationship between data objects and object types, that provides an efficient mechanism to query the organization of the data objects/object types stored therein (and the relationships therebetween) in a manner that is readily adaptable to client-server database systems or other distributed database systems.

These and other objects of the present invention will become apparent hereinafter.

Generally, the present invention comprises an improved command handler (and database system utilizing the improved command handler) that interfaces to a datastore storing item data for a plurality of items and bi-directional modifier data, corresponding to a relation between at least one first item and at least one second item, that represents first text characterizing semantics of a relationship of the at least one first item to the at least one second item, and that represents second text characterizing semantics of a relationship of the at least one second item to the at least one first item. The command handler operates, in response to receiving a first-type query command that specifies at least one given item, to access the datastore to identify i) at least one related item that is related to the given item, and identify ii) either the first text or the second text characterizing semantics of the relation between the given item and the at least one related item. The command hander returns i) data corresponding to the at least one related item; and ii) data corresponding to the identified first text and or second text characterizing semantics of the relation between the given item and the at least one related item. Preferably, the data returned in response to the first-type query command identifies the at least one related item. and identifies the first text or second text characterizing semantics of the relation between the given item and the at least one related item. In addition, the command handler preferably supports additional commands that retrieve from the datastore information related to specified objects, object types, and relations.

The command handler (and database system) of the present invention may be used in a wide assortment of software applications, including enterprise applications (such as e-business applications, supply chain management applications, customer relationship management applications, decision support applications), the file system in operating systems, web browsers, e-mail applications and personal information management applications. Importantly, the command handler (and database system) provides an efficient mechanism to query the organization of the data elements (and the relationships therebetween) stored and accessed in such software applications, in a manner that efficient and readily adaptable to client-server database systems or other distributed database systems.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein.

DETAILED DESCRIPTION OF THE PREFERRED EMBODIMENTS

Figure 1:
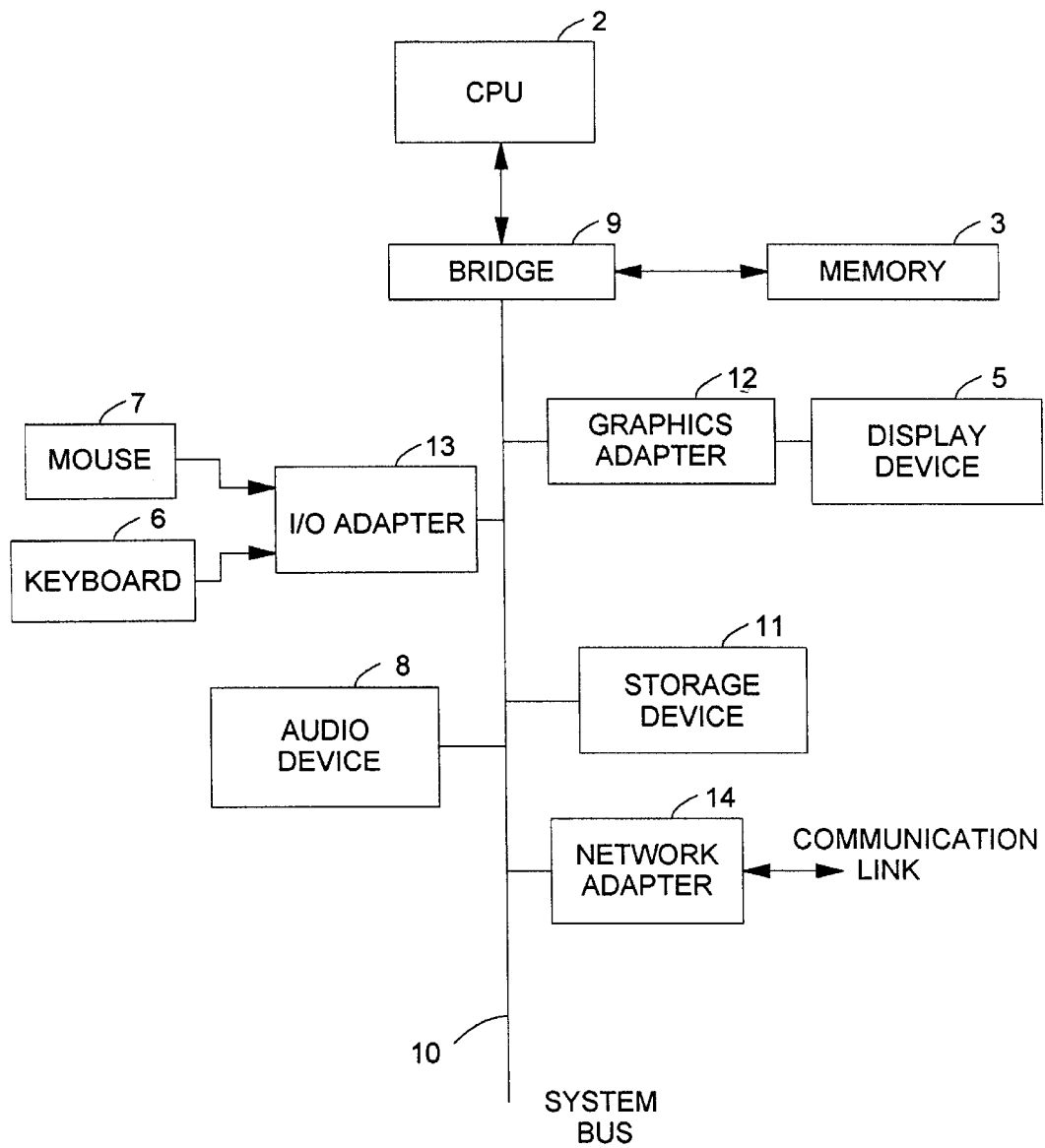
FIG. 1 is a schematic representation of a computer processing system in which the present invention may be embodied.

FIG. 1 is a schematic representation of a computer processing system in which the present invention may be embodied. As shown, the computer processing system 1 comprises a number of conventional components, namely: one or more central processing units 2 (e.g. microprocessors); memory 3 for storing an operating system (for example, Microsoft Windows, or a UNIX operating system), and the various data structures and routines of the present invention; a display device 5 having a screen or surface; one or more user input devices such as keyboard 6 (or other text input device) and a pointing and selecting device 7 such as a mouse; and optionally, one or more audio output devices (e.g. audio sound system) 8. As illustrated, each of these system components are operably associated with CPU(s) 2 by way of one or more bridges 9 (one shown) and one or more system busses 10 (one shown) in a manner well known in the art. The operating system and the various computational routines of the present invention are typically stored persistently in a storage device 11 (which may be a hard disk drive, optical disk drive or other persistent storage means), that is operably coupled to memory 3 via system bus(es) 10 and bridge(s) 9, and loaded into memory 3 for execution by the central processing unit(s) 2. The display device 5 is operably coupled to memory 3 and central processing unit(2) via a graphics adapter 12 in a manner well known in the art. The user input devices (e.g., keyboard 6 and mouse 7) are operably coupled to memory 3 and central processing unit(2) via an I/O adapter 13 in a manner well known in the art. In addition, components of the operating system and the various data structures and routines of the present invention may be stored and/or executed in a distributed manner on one or more systems operably coupled via a communication link to the network adapter 14 of the system of FIG. 1. The computer processing system 1 may be a personal computer, workstation, multi-user computer system, personal digital assistant or other programmable computing device.

Generalized Embodiment of the Software Application of the Present Invention

According to a generalized embodiment of the present invention, a software application is provided that enables users to manipulate and view an object data model that includes one or more objects (or items) and relations that characterize the semantics of the relationships between objects. These relationships may be a one-to-one relationship, one-to-many relationship, many-to-one relationship, or many-to-many relationship. Each object is represented by an object data structure that includes a plurality of fields (attributes) into which is stored useful information that describes characteristics of the corresponding object. The fields (attributes) of a given object may be used to encapsulate data and/or link to software functionality and/or processes pertinent to the given object. For example, the fields of a given object may include a pointer to a data link mechanism that enables access to the data for the given object as is well known in the art. Each relation is represented by a data structure that stores textual annotation characterizing the semantics of a relationship linking two (or more) objects. Preferably, the data structure (i.e., data records) representing a given relation linking two or more objects are separate from (and indirectly coupled to) the data structures representing these two or more objects.

The software application of the present invention provides functions for manipulating (creating, updating and deleting) objects in the object data model, for capturing contextual relationships between such objects and manipulating such relationships as relations in the object data model, and for viewing and navigating through the object data model.

In the preferred embodiment of the present invention, the semantics of a relationship between objects is constrained to a grammar of the form: <subject object(s)> <modifier text> <direct object(s)>, which is illustrated by the following example. Consider a "Department" object that includes attributes characterizing a given department of a company, and "Employee" objects that include attributes (such as social security number, job level, home address, etc) that characterize the employees of the company. In this example, semantics that characterize the relationship of the "Department" object to the "Employee" objects can be stated as "Department contains Employee." In this example, the "Department" object is the subject object, the "Employee" objects are direct objects, and the phrase "contains" is the modifier text.

Moreover, in the preferred embodiment of the present invention, the textual annotation stored by a given relation includes bi-directional modifier text, which includes: first text that characterizes the semantics of the relationship of the subject object(s) to direct object(s) of the given relation, and second text that characterizes the semantics of the relationship of the direct object(s) to subject object(s) of the given relation. Such bi-directional modifier text may be illustrated with the example presented above wherein the semantics of a relationship between the "Department" object and "Employee" objects can be stated as "Department contains Employees" and "Employees are assigned to Department." In this example, the first text of the bi-directional modifier text for the relation would be "contains", while the second text would be "are assigned to."

Preferably, the bi-directional modifier text includes first singular text that characterizes the semantics of the relationship of a singular subject object to one or more direct objects of a given relation, first plural text that characterizes the semantics of the relationship of a plurality of subject objects to one or more direct objects of a given relation, second singular text that characterizes the semantics of the relationship of a singular direct object to one or more subject objects of a given relation, and second plural text that characterizes the semantics of the relationship of a plurality of direct objects to one or more subject object of a given relation.

Preferably, the bi-directional modifier text for a given relation comprise arbitrary text strings defined by user input. Moreover, the data structures (i.e., data records) representing the given relation is preferably separate from (and indirectly coupled to) the data structures representing the subject object(s) and direct object(s); thus, in this case, the bi-directional modifier text is not defined by (and thus can differ from) any fields (attributes) of the data structures that represent the subject object(s) and direct object(s) of the given relation. This indirect coupling enables a relation to characterize the semantics of multiple relationships linking two (or more) objects (thus saving storage space) and enables a relation to characterize the semantics of a relationships linking two (or more) objects in disparate systems (for example, two different databases), which will be described below in more detail below.

Moreover, the software application of the present invention preferably includes two different types of relations: object relations and type relations. An object relation is represented by a data structure that stores textual annotation characterizing the semantics of a relationship linking two (or more) objects identified by object identifiers (or keys or pointers) stored therein. The data structure representing a given object relation preferably includes the following data members: one or more subject object identifiers—object identifiers (or keys or pointers) that identify the one or more subject objects of the given object relation; one or more direct object identifiers—object identifiers (or keys or pointers) that identify the one or more direct objects of the given object relation; first-modifier-text that characterizes the semantics of the relationship of the one or more subject objects to one or more direct objects of the given object relation; and second-modifier-text that characterizes the semantics of the relationship of the one or more direct objects to one or more subject objects of the given object relation. Preferably, the first-modifier-text and second-modifier-text for a given object relation are arbitrary text strings defined by user input.

A type relation is represented by a data structure that stores textual annotation characterizing the semantics of a relationship linking two (or more) object types identified by object type identifiers (or keys or pointers) stored therein. The data structure representing a given type relation preferably includes the following data members: one or more subject object type identifiers—object type identifiers (or keys or pointers) that identify one or more types of subject objects of the given type relation; one or more direct object type identifiers—object type identifiers (or keys or pointers) that identify one or more types of direct objects of the given type relation; first-modifier-text that characterizes the semantics of the relationship of the one or more subject object types to one or more direct object types of the given type relation; and second-modifier-text that characterizes the semantics of the relationship of the one or more direct object types to one or more subject object types of the given type relation. Preferably, the first-modifier-text and second-modifier-text for a given type relation are arbitrary text strings defined by user input.

Figure 2:
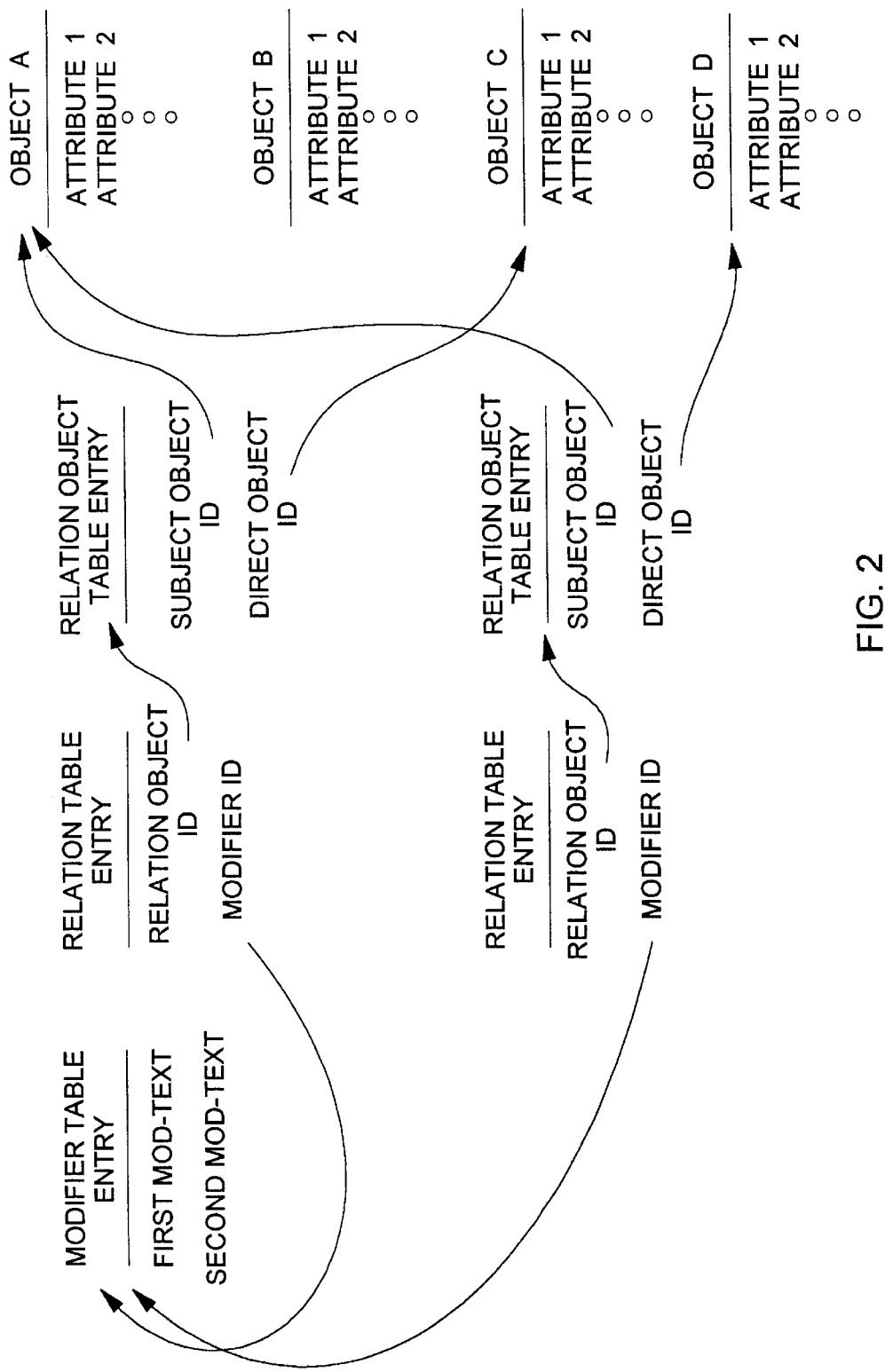
FIG. 2 illustrates the logical data structures representing an object relation, which stores textual annotation characterizing the semantics of a relationship linking two (or more) objects according to the present invention.
Figure 3:
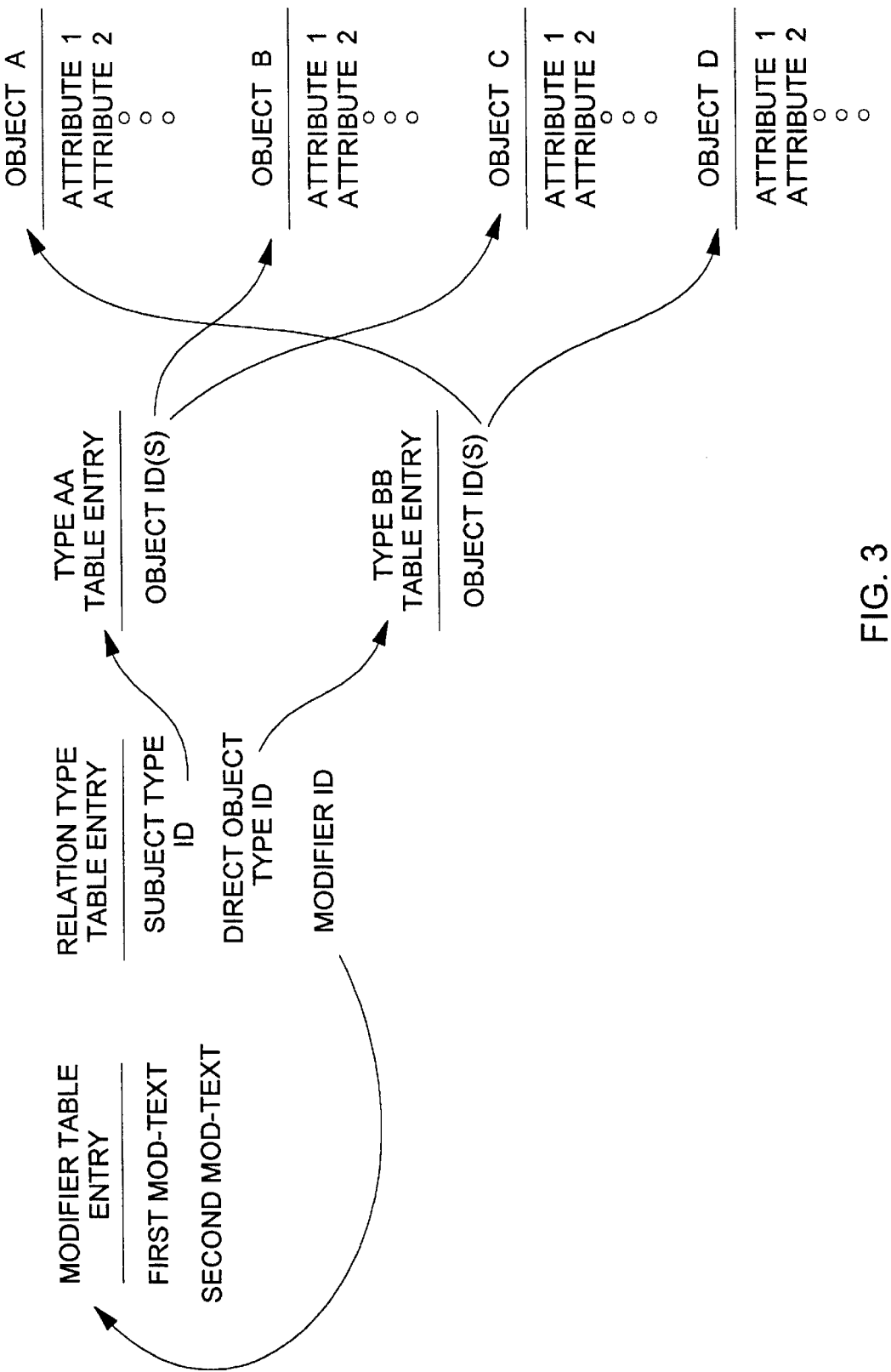
FIG. 3 illustrates the logical data structures representing a type relation, which stores textual annotation characterizing the semantics of a relationship linking two (or more) object types according to the present invention.

Illustrative Embodiments of the Logical Data Structures of the Object Data Model of the Present Invention FIGS. 2 and 3 illustrates an exemplary embodiment of logical data structures representing the inventive object data model of the present invention, including a plurality of objects (Object A, Object B, Object C and Object D as shown) each having a plurality of attributes (as data members) for storing useful information that describes characteristics of the corresponding object. The attributes of a given object may be used to encapsulate data and/or link to software functionality and/or processes pertinent to the given object. As shown in FIG. 3, a Type Table Entry for a given object type includes one or more object identifiers (or pointers or keys) that identify the objects that belong to the given object type.

FIG. 2 illustrates the logical data structures representing an object relation (which stores textual annotation characterizing the semantics of a relationship linking two (or more) objects as described above), including a Relation Table Entry, Relation Object Table Entry, and Modifier Table Entry.

The Relation Table Entry, for a given object relation, includes: i) a relation object identifier (or key, or pointer) that identifies a Relation Object Table Entry; and ii) a modifier identifier (or key, or pointer) that identifies a Modifier Table Entry. The Relation Object Table Entry, identified by the relation object identifier of the Relation Table Entry for the given object relation, includes: i) one or more subject object identifiers (or keys, or pointers) that identify the one or more subject objects of the given object relation; and ii) one or more direct object identifiers (or keys or pointers) that identify the one or more direct objects of the given object relation. The Modifier Table Entry, identified by the modifier identifier of the Relation Table Entry for the given object relation, stores: the first-modifier-text of the given object relation, which characterizes the semantics of the relationship of the one or more subject objects to the one or more direct objects of the given object relation; and the second-modifier-text of the given object relation, which characterizes the semantics of the relationship of the one or more direct objects to the one or more subject objects of the given object relation.

FIG. 3 illustrates the logical data structures representing a type relation (which stores textual annotation characterizing the semantics of a relationship linking two (or more) object types as described above), including a Relation Type Table Entry and Modifier Table entry.

The Relation Type Table Entry, for a given type relation, includes: i) one or more subject object type identifiers (or keys or pointers) that identify the one or more types of the subject objects of the given type relation; ii) one or more direct object type identifiers (or keys or pointers) that identify the one or more types of direct objects of the given type relation; and iii) a modifier identifier (or key or pointer) that identifies a Modifier Table Entry. The Modifier Table Entry, identified by the modifier identifier of the Relation Type Table Entry for the given type relation, stores: the first-modifier-text of the given type relation, which characterizes the semantics of the relationship of the one or more subject object types to the one or more direct object types of the given type relation; and the second-modifier-text of the given type relation, which characterizes the semantics of the relationship of the one or more direct object types to the one or more subject object types of the given type relation.

Figure 4:
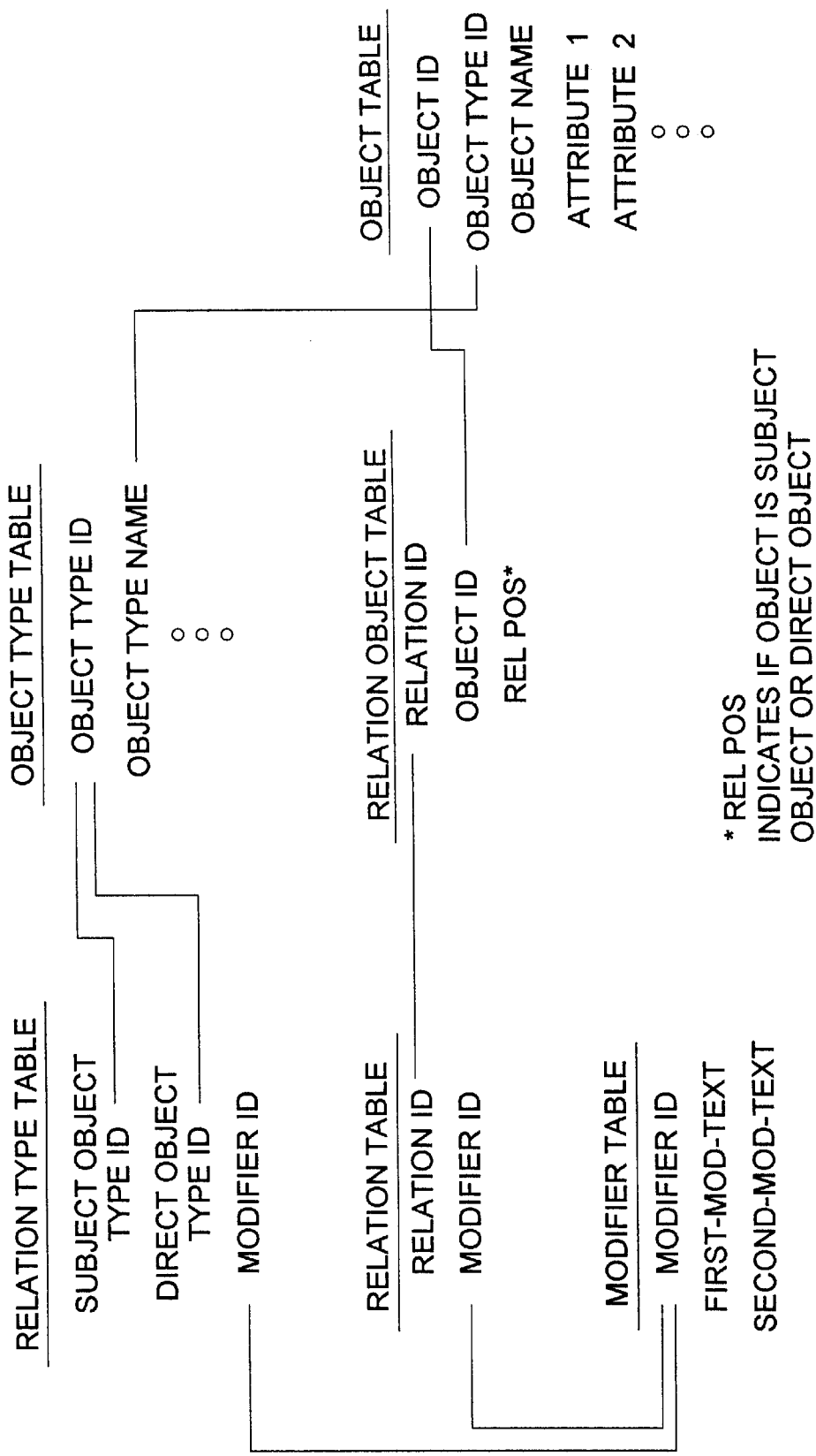
FIG. 4 illustrates an exemplary embodiment of the logical data structures of FIGS. 2 and 3 in a relational database model, including an Object Table, Relation Table, Relation Object Table, Modifier Table, Relation Type Table, and Object Type Table.

The logical data structures of the illustrative embodiment of FIGS. 2 and 3 may be embodied in any arbitrary database model including a relational database model, object database model, object-relational database model, network database model, or hierarchical database model. FIG. 4 illustrates an embodiment of the logical data structures of FIGS. 2 and 3 in a relational database model, including an Object Table, Relation Table, Relation Object Table, Modifier Table, Relation Type Table, and Object Type Table.

A given row of the Object Table is uniquely associated with a particular object in the object model, and includes the following data members as shown in FIG. 4:
an object identifier (or key) corresponding to the particular object;
an object type identifier (or key) corresponding to the type assigned to the particular object;
an object name field storing the name assigned to the particular object; and
a plurality of attribute fields for the particular object.

Alternatively, the name field and/or the attribute fields may not be part of the Object Table per se, but linked to the Object Table rows by software logic.

A given row of the Object Type Table is uniquely associated with a particular object type in the object model, and includes the following data members as shown in FIG. 4:
an object type identifier (or key) corresponding to the particular object type, that links the given row in the Object Type Table to a row in the Object Table (which uniquely corresponds to a particular object in the object model), thereby associating the assigned type to the particular object; and
an object type name field storing the name assigned to the particular object type.

Preferably, the object type name field stores a singular type name (assigned to the particular object type for the case when the particular object type has only one object) and a plural type name (assigned to the particular object type for the case when the particular object type has a plurality of objects).

A given row of the Relation Table is uniquely associated with a particular object relation (the textual annotation characterizing the semantics of a relationship linking two or more objects as described above) in the object model, and includes the following data members as shown in FIG. 4:
a relation identifier (or key), corresponding to the particular object relation, that links the given row of the Relation Table to rows in the Relation Object Table which link to the subject object(s) and direct object(s) of the particular object relation; and
a modifier identifier (or key) that links the given row of the Relation Table (which uniquely corresponds to a particular object relation in the object model) to a row in the Modifier Table storing the first-modifier-text and second-modifier-text of the particular object relation.

A given row of the Relation Object Table includes the following data members as illustrated in FIG. 4:
a relation identifier (or key) that links the given row of the Relation Object Table to a row in the Relation Table (which uniquely corresponds to a particular object relation in the object model);
an object identifier (or key) that links the given row in the Relation Object Table to a row in the Object Table (which uniquely corresponds to a particular object in the object model); and
a RelPos field whose value indicates whether the object identified by the object identifier (or key) of the given row is a subject object or direct object.

Note that there are at least two relation object table entries for each object relation: at least one relation object table entry for a subject object (value of the RelPos field indicates that the object identified by the object identifier (or key) of the given entry is a subject object; and at least one relation object table entry for a direct object (value of the RelPos field indicates that the object identified by the object identifier (or key) of the given entry is a direct object.

A given row of the Modifier Table includes the following data members as shown in FIG. 4:

a modifier identifier (or key) that links the given row of the Modifier Table to a row in the Relation Table (which uniquely corresponds to a particular object relation in the object model);

first-modifier-text, which characterizes the semantics of the relationship of the one or more subject objects to the one or more direct objects of the object relation linked thereto by the modifier identifier; and second-modifier-text, which characterizes the semantics of the relationship of the one or more direct objects to the one or more subject objects of the object relation linked thereto by the modifier identifier.

Preferably, the first-modifier-text includes first singular text which characterizes the semantics of the relationship of a singular subject object to one or more direct objects of the object relation linked thereto by the modifier identifier; and first plural text which characterizes the semantics of the relationship of a plurality of subject objects to one or more direct objects of the object relation linked thereto by the modifier identifier. Moreover, the second-modifier-text preferably includes second singular text which characterizes the semantics of the relationship of a singular direct object to one or more subject objects of the object relation linked thereto by the modifier identifier; and second plural text which characterizes the semantics of the relationship of a plurality of direct objects to one or more subject objects of the object relation linked thereto by the modifier identifier.

A given row of the Relation Type Table is uniquely associated with a particular type relation, and includes the following data members as illustrated in FIG. 4:

a subject object type identifier (or key) that links the given row in the Relation Type Table to a row in the Object Type Table (which corresponds to a subject object type in the object model for the particular type relation);

a direct object type identifier (or key) that links the given row in the Relation Type Table to a row in the Object Type Table (which corresponds to a direct object type in the object model for the particular type relation); and a modifier identifier (or key) that links the given row of the Relation Type Table to a row in the Modifier Table storing the first-modifier-text and second-modifier-text for the particular type relation.

Note that for a particular object relation as described above, a unique relation identifier is assigned thereto and a Relation Table row including this unique relation identifier is provided. The unique relation identifier provides a link to rows of the Relation Object Table which link to the subject object(s) and direct object(s) of the particular object relation. The modifier identifier of this Relation Table row provides a link to the row of the Modifier Table storing the first-modifier-text and second-modifier-text for the particular object relation. This structure allows multiple object relations to share the same bi-directional modifier text (stored in a given modifier table row).

Also note that, for a particular type relation as described above, a Relation Type Table row is provided that links to rows of the Object Type Table which correspond to the subject object type and direct object type in the object model for the particular type relation. The modifier identifier of this Relation Type Table row provides a link to the row of the Modifier Table storing the first-modifier-text and second-modifier-text for the particular type relation. This structure allows multiple type relations to share the same bi-directional modifier text (stored in a given modifier table row). Also not that the same bi-directional modifier text (stored in a given modifier table row) may be shared between object relations and type relations.

Figure 5A:
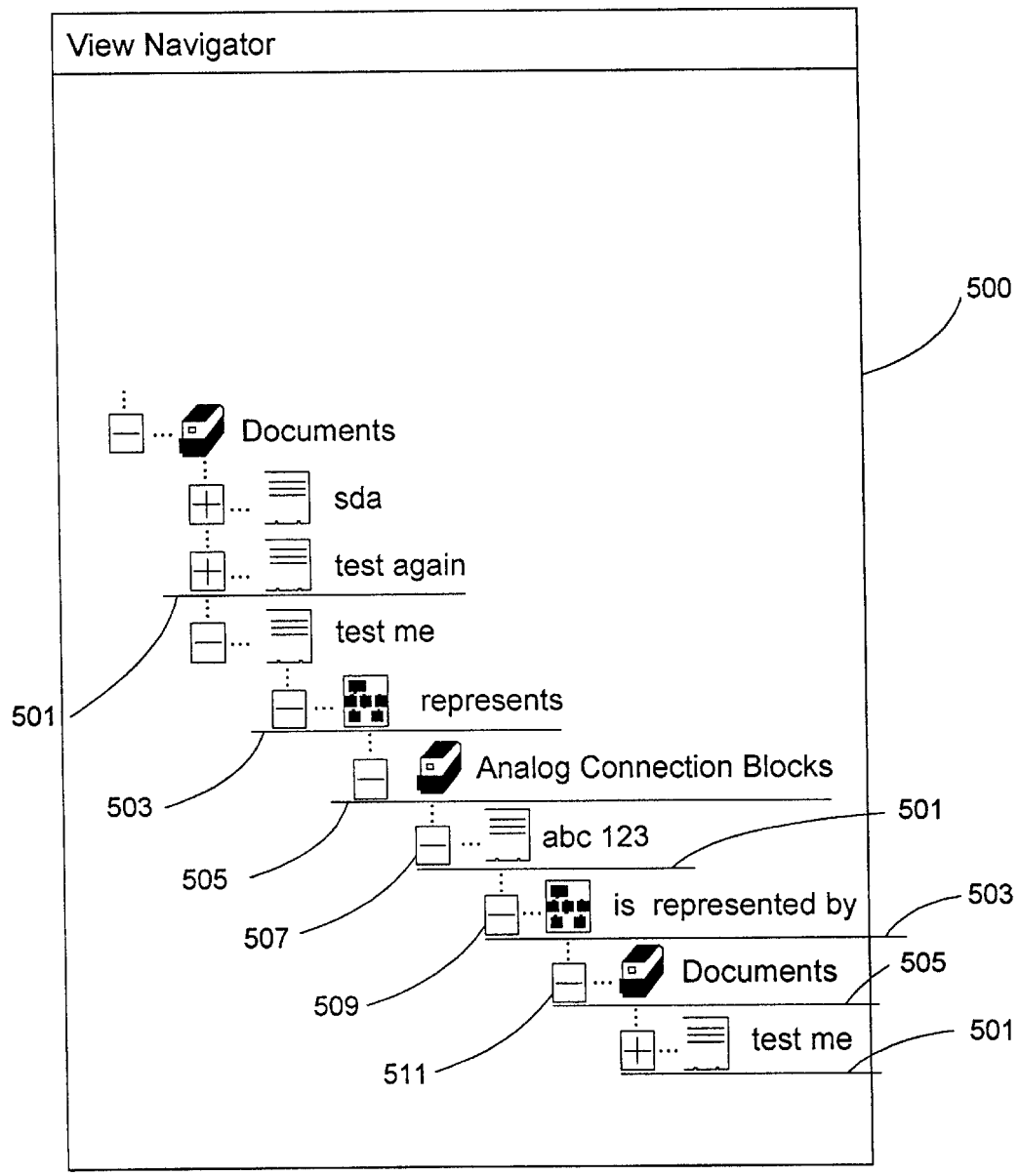
FIGS. 5A and 5B are views of a window representing an exemplary graphical user interface to a view/navigation mechanism of the present invention, including a hierarchical organization of nodes representing objects (object nodes), relations (relation nodes), types (type nodes) of the data object model.

Illustrative Embodiments of the Mechanism for Viewing and Navigating the Object Data Model According to the Present Invention The software application of the present invention preferably includes a view/navigation mechanism that enables users to manipulate and view the object data model (as described above) in a user-friendly manner that also provides natural language context to the relationships between objects. FIG. 5A is a view of a window 500 representing an exemplary graphical user interface to such a view/navigation mechanism, including a hierarchical organization of nodes representing objects (object nodes 501), relations (relation nodes 503), and types (type nodes 505) of the data object model. The view/navigation mechanism may be browser-based (e.g., implemented as a plug-in that utilizes the functionality of a web browser application such as Microsoft's Internet Explorer or Netscape's Navigator products).

Each object node 501 is associated with a given object $O_i$ in the object data model, and includes a graphical characterization of the object $O_i$ (such as displaying the name of object $O_i$ and/or displaying an icon associated with the object $O_i$). For example, FIG. 5A, illustrates object nodes 501 associated with the objects "sda", "test again", "test me", and "abc123. " User interaction (for example, a left mouse click on a button 507 of the given object node 501) results in expansion of the given object node 501 (parent object node) that spawns the display of one or more relation nodes 503 associated with the given parent object node. Further user interaction (for example, a mouse click on a button 509 of the relation node) results in the expansion of the relation node 503 (parent relation node) that spawns the display to one or more type nodes 505 associated with the parent object node and parent relation node. And further user interaction (for example, mouse click on a button 511 of type node) results in the expansion of the type node 505 (parent type node) to spawn the display of one or more object nodes 501 associated with the given parent object node, parent relation node and parent type node.

Each relation node 503 is associated with a given object relation (in the object data model) whose subject object(s) or direct object(s) is the object of the parent object node, and includes a graphical representation of either the first-modifier-text of the given object relation (in the event that the object of the parent object node is a subject object in this given object relation) or the second-modifier text of the given object relation (in the event that the object of the parent object node is a direct object in this given object relation), to thereby provide the user with a textual annotation characterizing semantics of a relationship associated with the object of the given parent object node.

In the preferred embodiment of the present invention as described above, the first-modifier-text of the given object relation includes first singular text that characterizes the semantics of the relationship of a singular subject object to one or more direct objects of the given object relation, and first plural text that characterizes the semantics of the relationship of a plurality of subject objects to one or more direct objects of the given object relation; and the second-modifier text includes second singular text that characterizes the semantics of the relationship of a singular direct object to one or more subject objects of the given object relation, and second plural text that characterizes the semantics of the relationship of a plurality of direct objects to one or more subject objects of the given object relation. In this preferred embodiment, a relation node 503 (resulting from expansion of an object node 501) depicts a graphical representation of:

the first singular text of the given object relation (in the event that the object of the parent object node is a subject object for the given object relation); or the second singular text of the given object relation (in the event that the object of the parent object node is a direct object for the given object relation).

Each type node 505 represents a graphical characterization (such as displaying the name or graphical icon) of: the type of one or more direct objects of the object relation of the parent relation node (in the event that the object of the parent object node is a subject object for the object relation of the parent relation node); or the type of one or more of the subject objects of the object relation of the parent relation node (in the event that the object of the parent object node is a direct object for the object relation of the parent relation node).

In the preferred embodiment of the present invention as described above, the name assigned to a particular object type is either a singular type name (assigned to the particular object type for the case when the particular object type has only one object), or a plural type name (assigned to the particular object type for the case when the particular object type has a plurality of objects). In this preferred embodiment, the type node 505 may include a graphical representation of:

the singular type name of a direct object of the object relation of the parent relation node (for the case where the object of the parent object node is a subject object for the object relation of the parent relation node, and the object type of the direct object has only one object);

the plural type name of a direct object of the object relation of the parent relation node (for the case where the object of the parent object node is a subject object for the object relation of the parent relation node, and the object type of the direct object includes a plurality of objects);

the singular type name of a subject object of the object relation of the parent relation node (for the case where the object of the parent object node is a direct object for the object relation of the parent relation node, and the object type of the subject object has only one object); or the plural type name of a subject object of the object relation of the parent relation node (for the case where the object of the parent object node is a direct object for the object relation of the parent relation node, and the object type of the subject object includes a plurality of objects).

Preferably, this node expansion process is recursive in nature. For example, in the preferred embodiment as illustrated in FIG. 5A, an object node 501 is expanded to display one or more relation nodes 503 associated with this object node (parent object node), at least one of these relation nodes 503 is expanded to display one or more type nodes 505 associated with this one relation node (parent relation node) and the parent object node, and at least one of these type nodes is expanded to display one or more object nodes associated with this one type node (parent type node) and the parent relation node and the parent object node. Any one of these object nodes can then be the subject of further node expansion as described above.

Figure 5B:
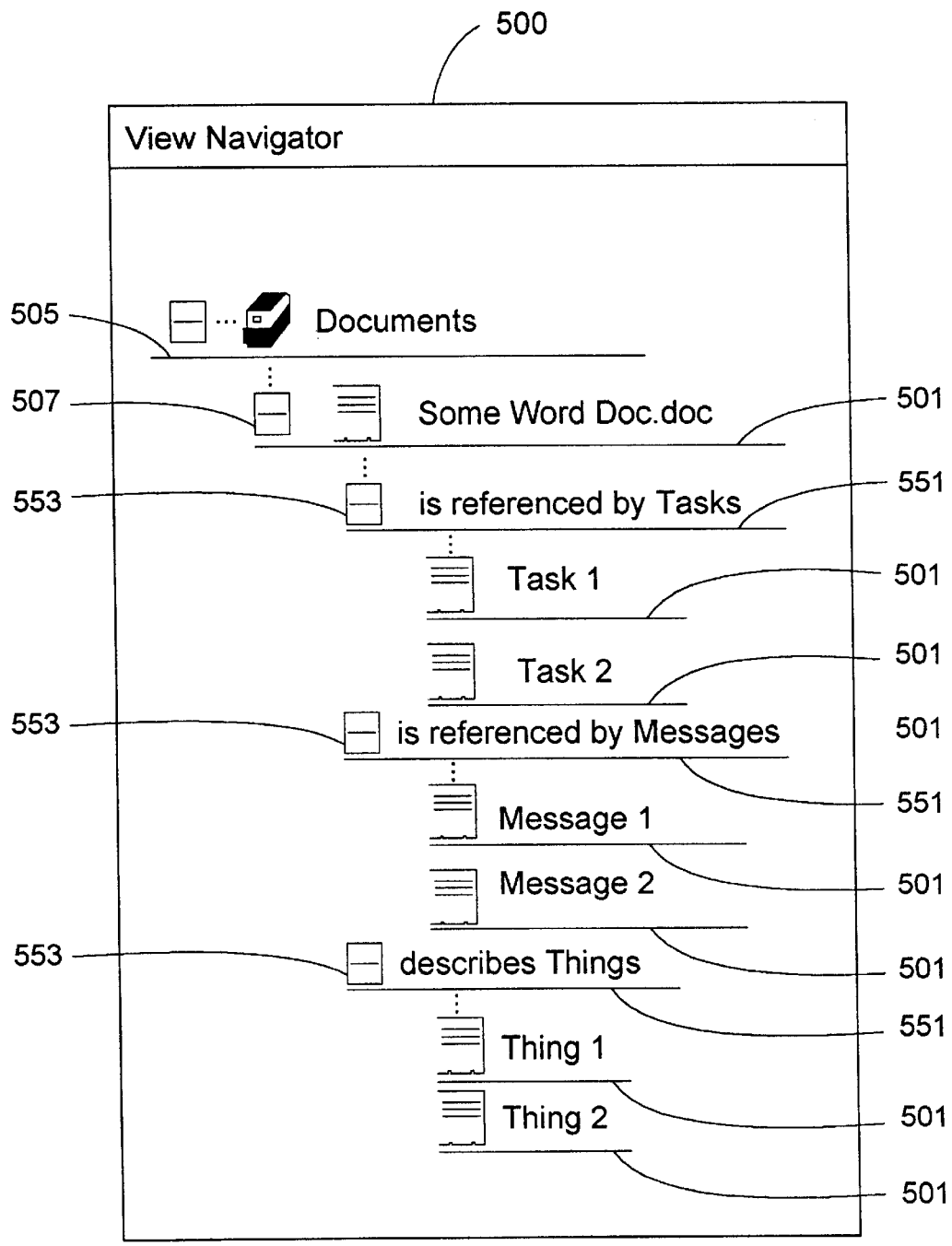

Moreover, the hierarchical organization of nodes that enable users to manipulate and view the object data model of the present invention preferably includes one or more mixed nodes 551 as shown in FIG. 5B. The mixed node 551 is a hybrid combination of a relation node and type node. As such, each mixed node 551 is associated with a particular object relation-object type pair in the object data model, wherein the particular object relation includes the object of the parent object node and whose one or more subject objects (or one or more direct objects) belong to the particular type. Each mixed node includes a graphical representation of either the first-modifier-text of the given object relation (in the event that the object of the parent object node is a subject object in this given object relation) or the second-modifier text of the given object relation (in the event that the object of the parent object node is a direct object in this given object relation), along with a graphical representation of the specified type associated therewith, to thereby provide the user with a textual annotation characterizing semantics of a relationship between the given object of the parent object node and one or more objects of the particular type. For example, FIG. 5B illustrates an object node 501 associated with objects "SomeWordDoc.doc". User interaction (for example, a right left mouse click on a button 507 of the given object node 501) results in expansion of the given object node 501 (parent object node) that spawns the display of one or more mixed nodes 551 associated with the given parent object node. In this example, there are three (3) mixed nodes 551 associated with the parent object node. One of the mixed nodes 551 corresponds to the modifier text "is referenced by" and the object type "Tasks" as shown. Another of the mixed nodes 551 corresponds to the modifier text "is referenced by" and the object type "Messages" as shown. Another of the mixed nodes 551 corresponds to the modifier text "describes" and the object type "Things" as shown. User interaction (for example, a mouse click on a button 553 of the given mixed node 551) results in expansion of the given mixed node 551 that spawns the display of one or more object nodes 501 corresponding to the particular relation-type pair of the mixed nodes 551 and the parent object node 501. A more detailed description of the expansion of a mixed node is described below.

In the preferred embodiment of the present invention as described above, the first-modifier-text of the given object relation includes first singular text that characterizes the semantics of the relationship of a singular subject object to one or more direct objects of the given object relation, and first plural text that characterizes the semantics of the relationship of a plurality of subject objects to one or more direct objects of the given object relation; and the second-modifier text includes second singular text that characterizes the semantics of the relationship of a singular direct object to one or more subject objects of the given object relation, and second plural text that characterizes the semantics of the relationship of a plurality of direct objects to one or more subject objects of the given object relation. In this preferred embodiment, a mixed node (resulting from expansion of an object node) depicts a graphical representation of:

the first singular text of the given object relation (in the event that the object of the parent object node is a subject object for the given object relation); or the second singular text of the given object relation (in the event that the object of the parent object node is a singular direct object for the given object relation).

Moreover, in the preferred embodiment of the present invention, the name assigned to a particular object type is either a singular type name (assigned to the particular object type for the case when the particular object type has only one object), or a plural type name (assigned to the particular object type for the case when the particular object type has a plurality of objects). In this preferred embodiment, the mixed node may include a graphical representation of:

the singular type name of a direct object of the object relation of the mixed node (for the case where the object of the parent object node is a subject object for the object relation of the mixed node, and the object type of the direct object has only one object);

the plural type name of a direct object of the object relation of the mixed node (for the case where the object of the parent object node is a subject object for the object relation of the mixed node, and the object type of the direct object includes a plurality of objects); or the singular type name of a subject object of the object relation of the mixed node (for the case where the object of the parent object node is a direct object for the object relation of the mixed node, and the object type of the subject object has only one object); or the plural type name of a subject object of the object relation of the mixed node (for the case where the object of the parent object node is a direct object for the object relation of the mixed node, and the object type of the subject object includes a plurality of objects).

Preferably, one or more mixed nodes are displayed by expanding an object node in response to a predetermined user input (for example, right mouse click on an object node button), and at least one of these mixed nodes may be expanded to display one or more object nodes associated with this one mixed node. Any one of these object nodes can then be the subject of further node expansion as described above.

Figure 6:
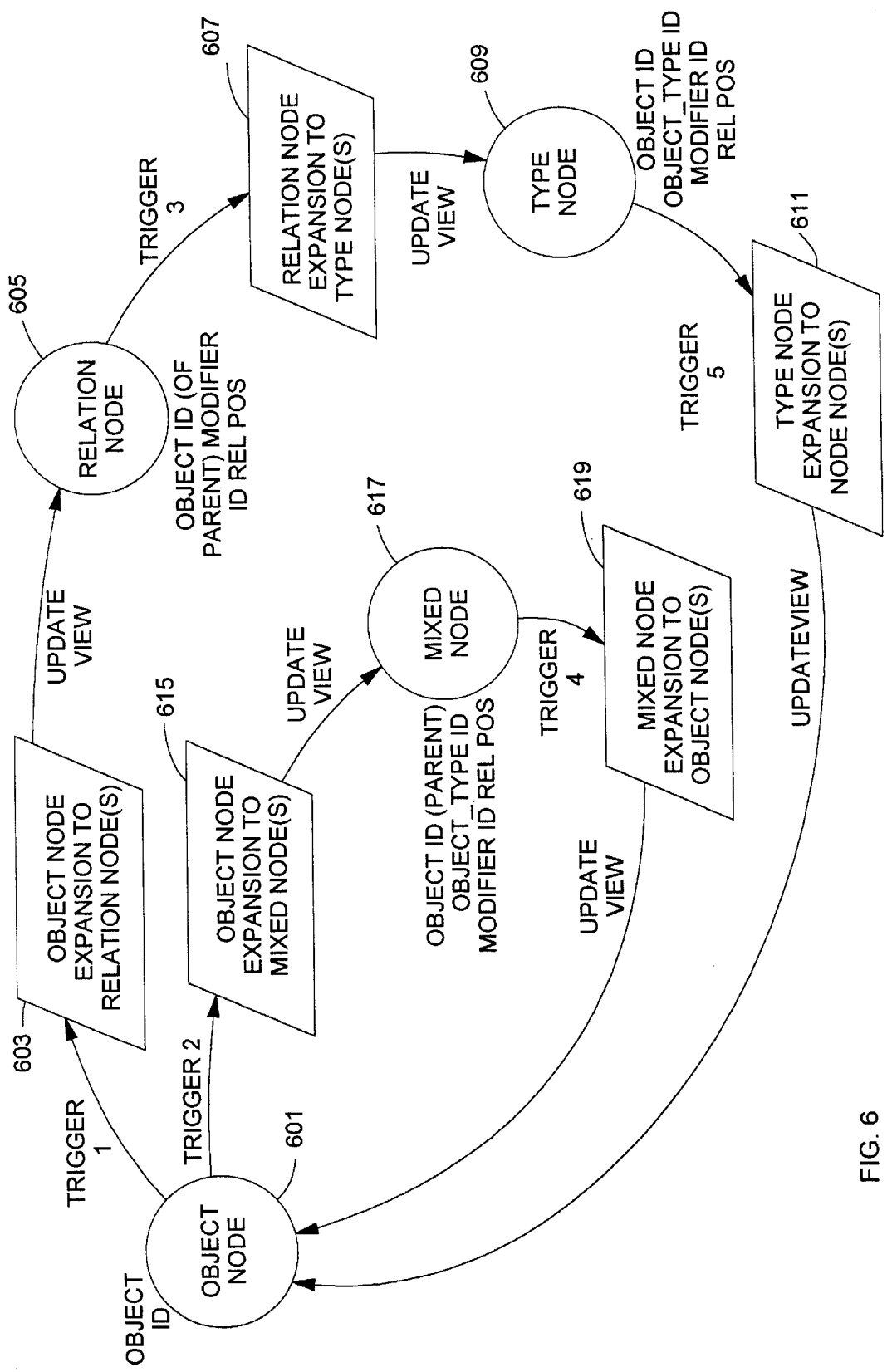
FIG. 6 is a schematic state diagram illustrating an exemplary embodiment of a view/navigation mechanism that generates the view window of FIGS. 5A and 5B, thereby enabling users to manipulate and view the object data model of the present invention.

FIG. 6 is a schematic state diagram illustrating an exemplary embodiment of a view mechanism that generates the view window 500 of FIGS. 5A and 5B, thereby enabling users to manipulate and view the object data model of the present invention. In step 601, one or more object nodes 501 are displayed in the window 500. User interaction, for the sake of description labeled "trigger_1" (which, for example, may be a left mouse click on a button 507 of a given object node 501), results in a transition to step 603 wherein the given object node 501 is expanded to generate one or more relation nodes 503 associated with the given object node. A more detailed description of exemplary operations in generating the one or more one relation nodes associated with the given object node is set forth below.

In step 605, the window 500 is updated to display the one or more relation nodes generated in step 603. User interaction, for the sake of description labeled "trigger_3" (which, for example, may be a mouse click on a button 509 of a given relation node 503), results in a transition to step 607 wherein the given relation node 503 is expanded to generate one or more type nodes 505 associated with the parent object node (expanded in step 603) and given relation node 503. A more detailed description of exemplary operations in generating the one or more one type nodes associated with the given relation node is set forth below.

In step 609, the window 500 is updated to display the one or more type nodes generated in step 607. User interaction, for the sake of description labeled "trigger_5" (which, for example, may be a mouse click on a button 511 of a given type node 505), results in a transition to step 611 wherein the given relation node 503 is expanded to generate one or more object nodes 501 associated with the parent object node (expanded in step 603), parent relation node (expanded in step 605) and the given type node 505. A more detailed description of exemplary operations in generating the one or more one object nodes associated with the given type node is set forth below. After step 611, the window 500 is updated to display the one or more object nodes generated in step 609, and preferably the operation recursively returns back to the operations of step 601.

In addition, the nodes generated and handled by the view mechanism of FIG. 6 preferably includes one or more mixed nodes. As described above, a mixed node is a hybrid combination of a relation node and type node. The view mechanism operations that generate and handle mixed nodes follow step 601 wherein one or more object nodes 501 are displayed in the window 500. Therein, user interaction, for the sake of description labeled "trigger_2" (which, for example, may be a right mouse click on a button 507 of a given object node 501), results in a transition to step 615 wherein the given object node 501 is expanded to generate one or more mixed nodes associated with the given object node. A more detailed description of exemplary operations in generating the one or more one mixed nodes associated with the given object node is set forth below.

In step 617, the window 500 is updated to display the one or more mixed nodes generated in step 615. User interaction, for the sake of description labeled "trigger_4" (which, for example, may be a mouse click on a button of a given mixed node, results in a transition to step 619 wherein the given mixed node is expanded to generate one or more object nodes 501 associated with the parent object node (expanded in step 615) and the given mixed node. A more detailed description of exemplary operations in generating the one or more one object nodes associated with the given mixed node is set forth below. After step 619, the window 500 is updated to display the one or more object nodes generated in step 619, and preferably the operation recursively returns back to the operations of step 601.

FIG. 6 illustrates an exemplary embodiment of a view mechanism that generates the view window 500 of FIGS. 5A and 5B, thereby enabling users to manipulate and view the object data model of the present invention. In a preferred embodiment of the present invention, the object data model of the present invention is embodied in a relational database management system (RDBMS) using tables as illustrated in FIG. 4. Examples of such RDBMS systems include the Oracle's 8i RDBMS product line, IBM's DB2 product line and Informix's RDBMS systems.

The following section provides pseudo-code illustrating exemplary operations for object node expansion, relation node expansion, type node expansion and mixed node expansion for the object data model embodied in tables in such an RDBMS system. However, the present invention is not limited thereto, as it should be apparent to one skilled in the art that such operations are readily portable to any arbitrary database system, including object oriented database systems and other non-relational database systems.

Object Node Expansion to Relation Node(s)

in a view window, an object node (e.g., name and possibly graphical representation of a given Object $O_i$) is displayed; an objectID is associated with the given Object $O_i$ of the object node; in response to a predetermined user-input event (for example, left mouse click on the object node expansion button), the view window is updated to include one or more relation nodes (e.g., a display of the textual annotation characterizing semantics of a relationship associated with the given object $O_i$).

steps:
use Get_Related Modifier (see code below) to identify the set of modifierIDs (and corresponding RelPos values) for object relations wherein the object $O_i$ is either a subject object or direct object (as specified by the corresponding RelPos value);
for each given modifierID and associated RelPos value in this set,
use the given modifierID to identify the corresponding modifier table entry and use the associated RelPos value to retrieve either Mod1 text (in the case that the RelPos value indicates that the Object $O_i$ is a subject object in this relation) or Mod2 text (in the case that RelPos indicates that Object $O_i$ is a direct object in this relation), and
update the view window to include a relation node (preferably, indented from the object node for object $O_i$) that displays the retrieved text (Mod1 text or Mod2 text) to thereby provide a textual annotation characterizing semantics of a relationship associated with the given object $O_i$.

In the preferred embodiment of the present invention, the retrieved Mod1 text may be selected from the first singular text of the corresponding modifier table entry (in the event that the object of the parent object node is a subject object for the corresponding object relation); and the retrieved Mod2 text may be selected from the second singular text of the of the corresponding modifier table entry (in the event that the object of the parent object node is a direct object for the corresponding object relation).

Object Node Expansion to Mixed Node(s)
in a view window, an object node (e.g., name and possibly graphical representation of a given Object $O_i$) is displayed; an objectID is associated with the given Object $O_i$ of the object node; in response to a predetermined user-input event (for example, right mouse click on the object node expansion button), the view window is updated to include one or more mixed nodes (e.g., a display of a textual annotation characterizing semantics of a relationship between the given object $O_i$ of the parent object node and one or more objects of one or more types).

steps:
identify the set of relation object table entries (rows) whose objectID field matches the given objectID, and store the relationID and RelPos field of the entry in this set of relation object table entries;
for each stored relationID,
identify the relation object table entries (rows) whose relationID field matches the stored relationID and whose objectID field identifies an object other than the given object $O_i$ and whose RelPos field differs from the stored RelPos field; and store the objectID and RelPos value for the matching relation object table;
for each stored objectID,
identify and store the ObjectTypeID of the object table entry (row) whose objectID field matches the stored objectID,
identify and store the ObjectTypeName of the object type table entry (row) whose ObjectTypeID field that matches the stored ObjectTypeID,
identify and store the ModifierID of the relation table entry (row) whose RelationID field matches the stored relationID,
add the 4-tuple (stored ObjectType, stored ObjectTypeName, stored RelPos value, stored ModifierID) to a list of 4-tuples;
remove any duplicates from the list of 4-tuples; and
for each 4-tuple in the list of 4-tuples,
use the stored modifierID to identify the matching modifier table entry (row), and use the stored RelPos value to retrieve from the matching modifier table entry (row) either Mod1 text (in the case that the stored RelPos value indicates that one or more objects belonging to the stored ObjectTypeID are subject objects in this relation) or Mod2 text (in the case that stored RelPos value indicates that one or more objects belonging to the stored ObjectTypeID are direct objects in this relation), and
update the view window to include one or more mixed nodes (preferably, indented from the object node for object $O_i$) that displays the retrieved text (Mod1 text or Mod2 text) and the stored ObjectTypeName to thereby provide a textual annotation characterizing semantics of a relationship between the given object $O_i$ and one or more objects of one or more types.

In the preferred embodiment of the present invention, the retrieved Mod1 text may be selected from the first singular text of the corresponding modifier table entry (in the event that the object of the parent object node is a subject object for the corresponding object relation); and the retrieved Mod2 text may be selected from the second singular text of the of the corresponding modifier table entry (in the event that the object of the parent object node is a direct object for the corresponding object relation). Moreover, the stored ObjectTypeName (of the object type table entry whose ObjectTypeID field matches the stored ObjectTypeID) may be selected from one of: the singular type name for the ObjectTypeID (for the case where the object type objectTypeID of the object (whose RelPos value differs from the RelPos value of the given object $O_i$) for the object relation RelationID has only one object); or the plural type name for the ObjectTypeID (for the case where the object type objectTypeID of the object (whose RelPos value differs from the RelPos value of the given object $O_i$) for the object relation RelationID has a plurality of objects).

Relation Node Expansion to Type Node(s)
in a view window, a relation node (e.g., textual annotation characterizing semantics of a relationship associated with the object $O_i$ of the parent object node) is displayed; a given modifierID (and/or relationID) and RelPos value is associated with the relation node; an objectID is associated with Object $O_i$ of the parent object node; in response to a predetermined user-input event (for example, mouse click on the parent relation node expansion button), the view window is updated to include one or more type nodes (e.g., a description of a type of objects associated with the parent relation node).

steps:
identify the set of relation object table entries (rows) whose objectID matches the given objectID and whose corresponding relation table entry (the entry in the relation table that stores a relationID that matches the relationID of the relation object table entry) has a modifierID that matches the given modifierID;
for each given relationID in this set of relation object table entries, scan the relation object table to include the objectID of any relation object table entry whose relationID matches the given relationID and whose RelPos is opposite the RelPos of the relation node to a set of objectIDs;
for each given objectID in this set, scan the entries of the Object Table to include the ObjectTypeID of the entry whose ObjectID matches the given ObjectID to a set of ObjectTypeIDs; and for each given ObjectTypeID in this set, scan the Object Type Tables to retrieve the Object Type Name of the entry whose ObjectTypeID matches the given ObjectTypeID and update the view window to include a type node (preferably, indented from the parent relation node) that displays the retrieved Object Type Name.

The ObjectTypeName (of the object type table entry whose ObjectTypeID field matches the given ObjectTypeID) may be selected from one of: the singular type name for the given ObjectTypeID (for the case where the object type objectTypeID of the object (whose RelPos value differs from the RelPos value of the given object $O_i$) for the object relation RelationID has only one object); or the plural type name for the given ObjectTypeID (for the case where the object type objectTypeID of the object (whose RelPos value differs from the RelPos value of the given object $O_i$) for the object relation RelationID has a plurality of objects).

Type Node Expansion to Object Node(s)

in a view window, a type node (e.g., description, such as a name and possibly a graphical representation, of a type of objects associated with a parent object node/relation node pair) is displayed; a given modifierID, ObjectTypeID and RelPos value is associated with the type node; an objectID is associated with the Object $O_i$ of the parent object node; in response to a predetermined user-input event (for example, mouse click on the type node expansion button), the view window is updated to include one or more object nodes (e.g., description of objects associated with the parent relation node/type node pair)

steps:

identify the set of relation object table entries (rows) whose objectID matches the given objectID and whose corresponding relation table entry (the entry in the relation table that stores a relationID that matches the relationID of the relation object table entry) has a modifierID that matches the given modifierID;

for each given relationID in this set of relation object table entries, scan the relation object table to include the objectID of any relation object table entry whose relationID matches the given relationID and whose RelPos is opposite the RelPos of the relation node to a set of objectIDs;

for each given objectID in this set of objectIDs, identify the object table entry whose objectID matches the given objectID, and if the ObjectTypeID of this matching entry matches the ObjectTypeID for the parent type node, retrieve the object name from the object type name field of the matching object type table entry and update view to include an object node (preferably, indented from the parent type node) that displays the retrieved object name text and possibly a graphical representation of this object.

Mixed Node Expansion to Object Nodes in a view window, a mixed node (e.g., a display of a textual annotation characterizing semantics of a relationship between the given object $O_i$ of the parent object node and one or more objects of the specified type) is displayed; a given modifierID, ObjectTypeID and RelPos value is associated with the mixed node; an objectID is associated with the Object $O_i$ of the parent object node; in response to a predetermined user-input event (for example, mouse click on the mixed node expansion button), the view window is updated to include one or more object nodes (e.g., description of objects associated with the parent mixed node).

steps:

identify the set of relation object table entries (rows) whose objectID matches the given objectID and whose corresponding relation table entry (the entry in the relation table that stores a relationID that matches the relationID of the relation object table entry) has a modifierID that matches the given modifierID;

for each given relationID in this set of relation object table entries, scan the relation object table to include the objectID of any relation object table entry (whose relationID matches the given relationID and whose RelPos is opposite the RelPos of the relation node) to a set of objectIDs;

for each given objectID in this set of objectIDs, identify the object table entry whose objectID matches the given objectID, and if the ObjectTypeID of this matching entry matches the ObjectTypeID for the mixed node, retrieve the object name from the object type name field of the matching object type table entry and update the view window to include an object node (preferably, indented from the parent mixed node) that displays the retrieved object name text and possibly a graphical representation of this object.

Figure 10A:
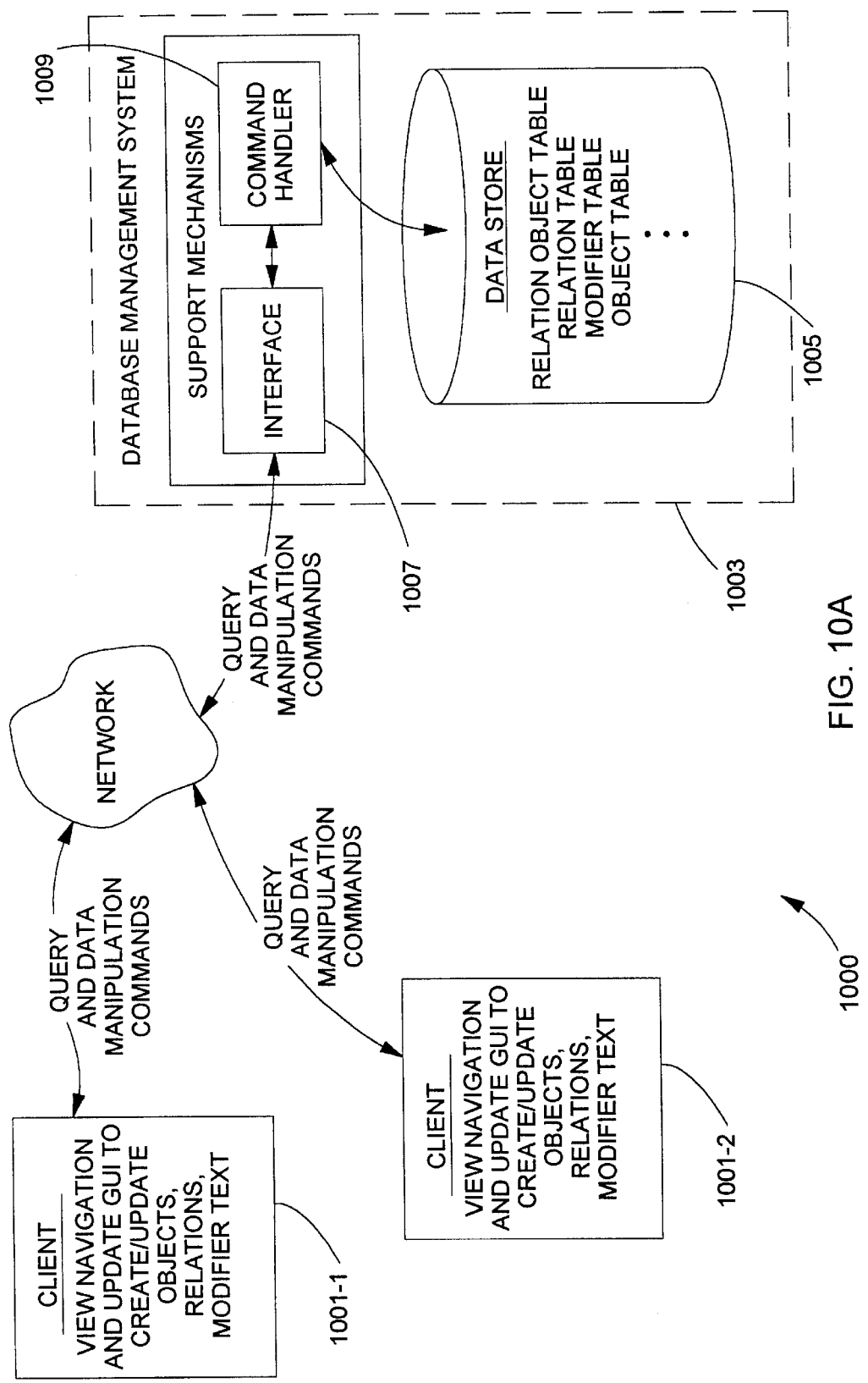
FIGS. 10A and 10B are a schematic representation of the primary components of illustrative embodiments of the database system 1000 of the present invention
Figure 10B:
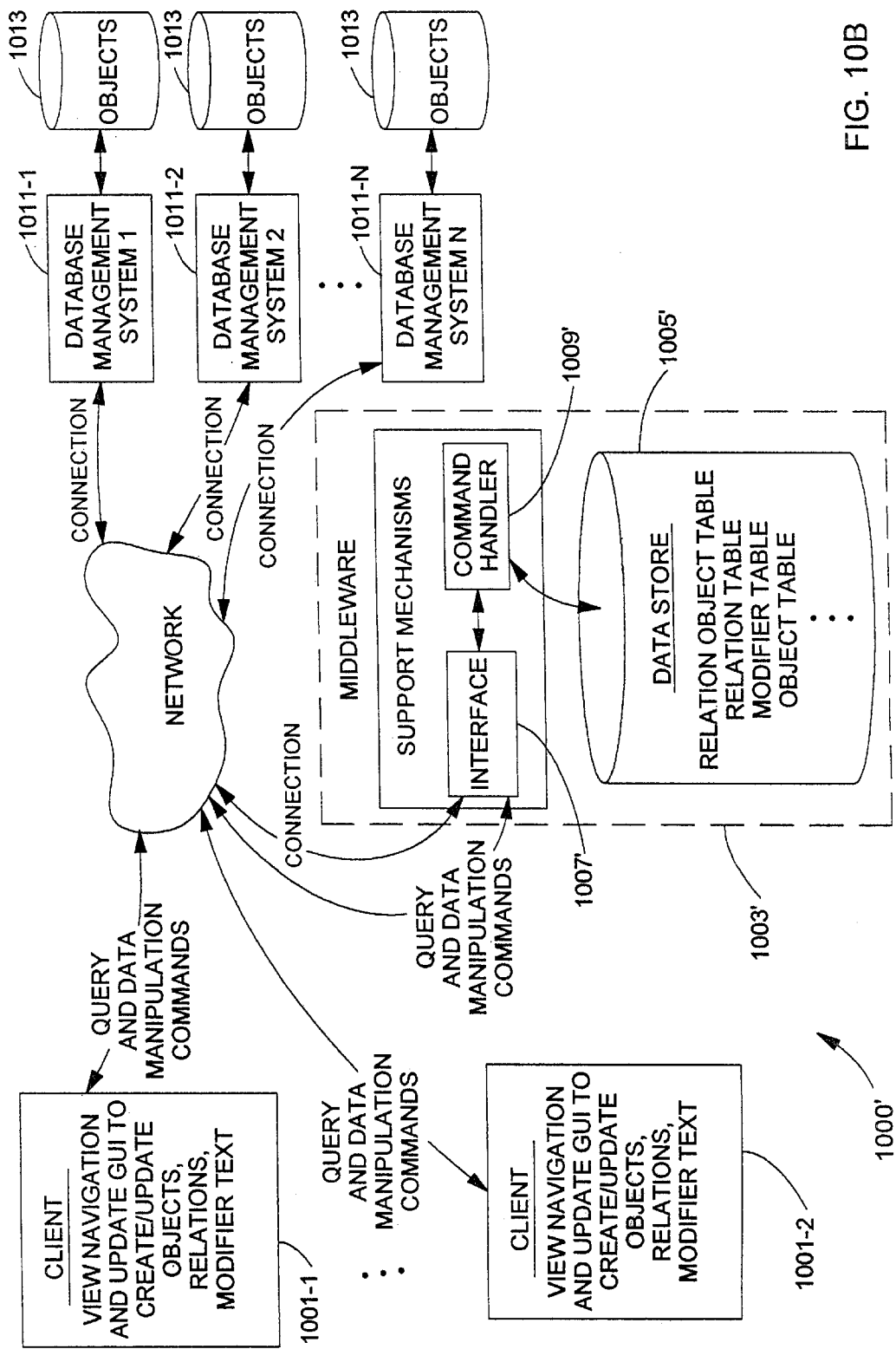

It should be noted that the node expansion operations as described above with respect to FIG. 6 for a collection of nodes may be performed in a batch mode (for example, by a server-side database management system as illustrated in FIGS. 10A and B) and stored in persistent storage (e.g., cache) for subsequent access (for example, by a client-side software application executing on a client machine as illustrated in FIGS. 10A and 10B) when dynamically updating the view window.

The node expansion operations of the view mechanism as described above in FIGS. 5 and 6 and associated pseudo-code preferably utilize the following functions/methods:

Function/Method: Get-Related-Objects-Heterogeneous input parameters: objectID, modifierID, RelPos returned output: set of objectIDs for those object(s) that have a relation with an object that satisfies the following constraints—i) the object is identified by the given objectID; ii) the object is in a relation position identified by the given RelPos; and iii) the modifier of the relation with the object is identified by the given modifierID.

steps:

identify the set of relation object table entries (rows) whose objectID matches the given objectID and whose corresponding relation table entry (the entry in the relation table that stores a relationID that matches the relationID of the relation object table entry) has a modifierID that matches the given modifierID;

for each relationID in this set of relation object table entries, scan the relation object table to include the objectID of the relation object table entry (if other than the given objectID and other than the given RelPos) to a set of objectIDs; and return this set of objectIDs.

Function/Method: Get-Related-Objects-Homogenous input parameters: objectID, modifierID, ObjectTypeID, RelPos returned output: set of objectIDs for those object(s) of type ObjectTypeID that have a relation with an object that satisfies the following constraints—i) the object is identified by the given objectID; ii) the object is in a relation position identified by the given RelPos; and iii) the modifier of the relation with the object is identified by the given modifierID.

steps:

use Get-Related-Objects-Heterogeneous to identify set of objectIDs for those object(s) that have a relation with the object identified by the given objectID that is characterized by the modifier identified by the given modifierID;

for each given objectID in set, delete if the ObjectTypeID of corresponding entry in the object table (the object table entry whose objectID matches the given objectID) does not match the given ObjectTypeID; and return this set of objectIDs.

Function/Method: Get Related Objects Types
 input parameters: objectID, modifierID, RelPos
 returned output: set of ObjectTypeID(s) for those type(s) having at least one object that has a relation with an object that satisfies the following constraints—i) the object is identified by the given objectID; ii) the object is in a relation position identified by the given RelPos; and iii) the modifier of the relation with the object is identified by the given modifierID.
 steps:
  identify a first set of relation object table entries (rows) whose objectID matches the given objectID and whose corresponding relation table entry (the entry in the relation table that stores a relationID that matches the relationID of the relation object table entry) has a modifierID that matches the given modifierID;
  for each given relationID in this first set of relation object table entries,
   identify a second set of relation object table entries (having objectID and RelPos other than the given objectID and given RelPos) that have a relationID that matches the given relationID in the first set;
   for each relation object table entry in the second set, include the objectID of the entry to a set of objectIDs;
   for each given objectID in this set, scan the object table entries to include the ObjectTypeID of any object table entry that matches the given objectID to a set of ObjectTypeIDs;
   remove any duplicate ObjectTypeID in this set; and
   return the Set of ObjectTypeIDs.

Get Related Modifiers
 input parameter: objectID
 returned output: list of modifierIDs corresponding to relations wherein the object identified by the given objectID is either a subject object or direct object, and the RelPos value (corresponding to each relation) that identifies if the object identified by the given objectID is a subject object or direct object for the corresponding relation.
 steps:
  identify the set of relation object table entries (rows) whose objectID field matches the given objectID, and store the RelPos value for the matching relation object table entries (rows);
  identify the corresponding set of relation table entries whose relationID field matches the relationID field of the identified set of relation object table entries;
  identify the set of modifierIDs for this identified set of relation table entries; and
  return this Set of modifierIDs and the corresponding stored RelPos values.

Illustrative Embodiments of Graphical User Interface Mechanisms for Creating and Updating the Object Data Model According to the Present Invention In addition, the software environment of the present invention preferably includes a graphical user interface that enables users to create and update the elements of the object data model of the present invention as set forth above.

Figure 7A:
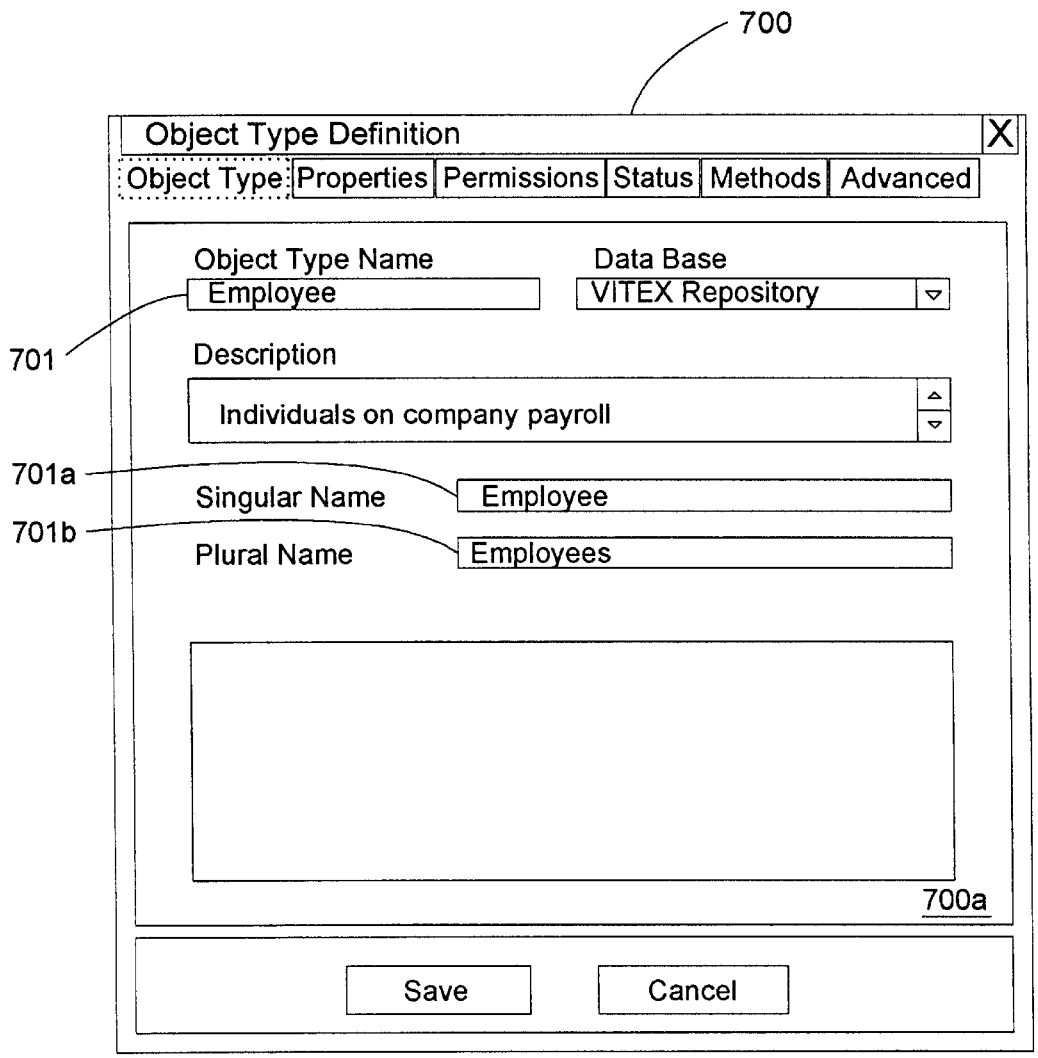
FIGS. 7A, 7B and 7C illustrate an exemplary graphical user interface (and invocation of this graphical user interface) that enables a user to create and update an object type according to the present invention.
Figure 7B:
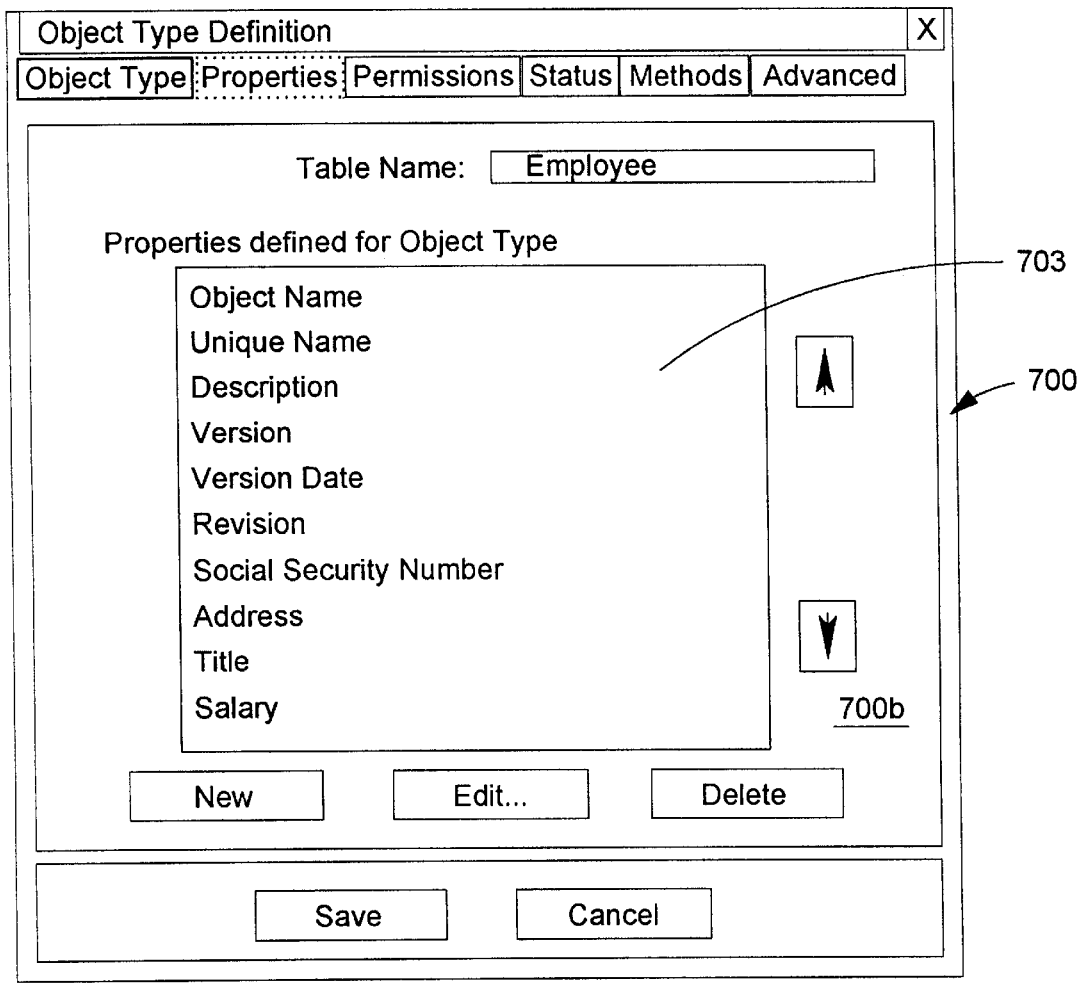
Figure 7C:
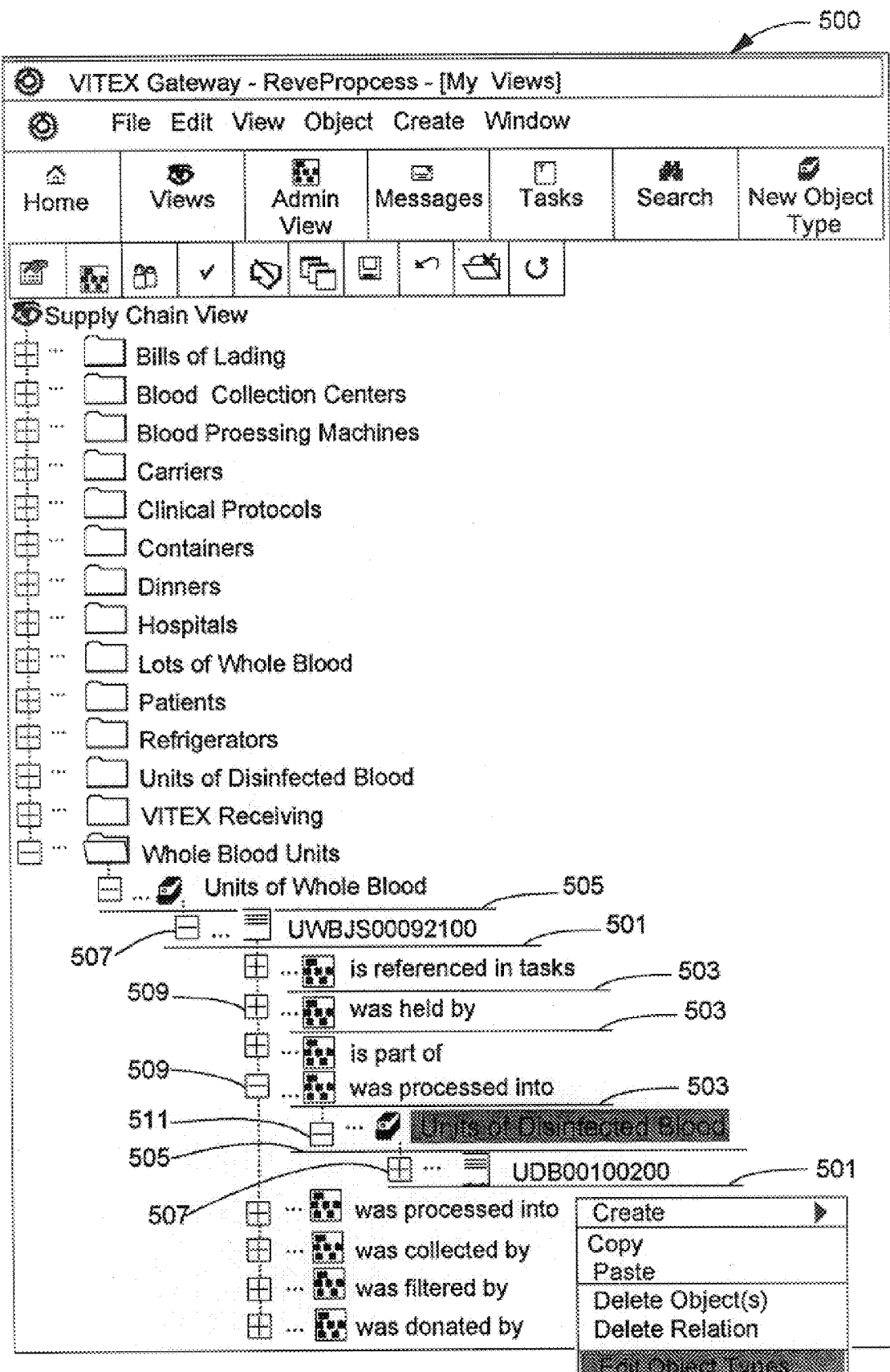

FIGS. 7A and 7B illustrate an exemplary graphical user interface (GUI) 700 that enables a user to create and update an object type. The GUI 700 includes two tabbed windows. The first window labeled "Object Type" is shown in FIG. 7A, and the second window labeled "Properties" is shown in FIG. 7B. The "Object Type" window 700*a* of FIG. 7A includes at least one input frame 701 for inputting an object type name (e.g., a text string representing the object type name). Moreover, it includes two input frames 701*a* and 701*b* for inputting the singular name and plural name, respectively, for the object type. As described above, the singular name is used as the name of the type for the case when the particular object type has only one object, and the plural name is used as the name of the type when the particular object type has a plurality of objects. As shown in FIG. 7B, the "Properties" window 700*b* includes an input frame 703 for specifying a set of attributes (or properties) associated with objects of the object type (and possibly for specifying the type of these attributes or other properties for these attributes, which is not shown). Preferably, the GUI 700 is invoked through user interaction with pull down menus associated with the view window 500 of the view mechanism of FIGS. 5A and 5B and/or through user interaction with the corresponding type node of the view window 500 as illustrated in FIG. 7C, or other user interaction operations.

Figure 8A:
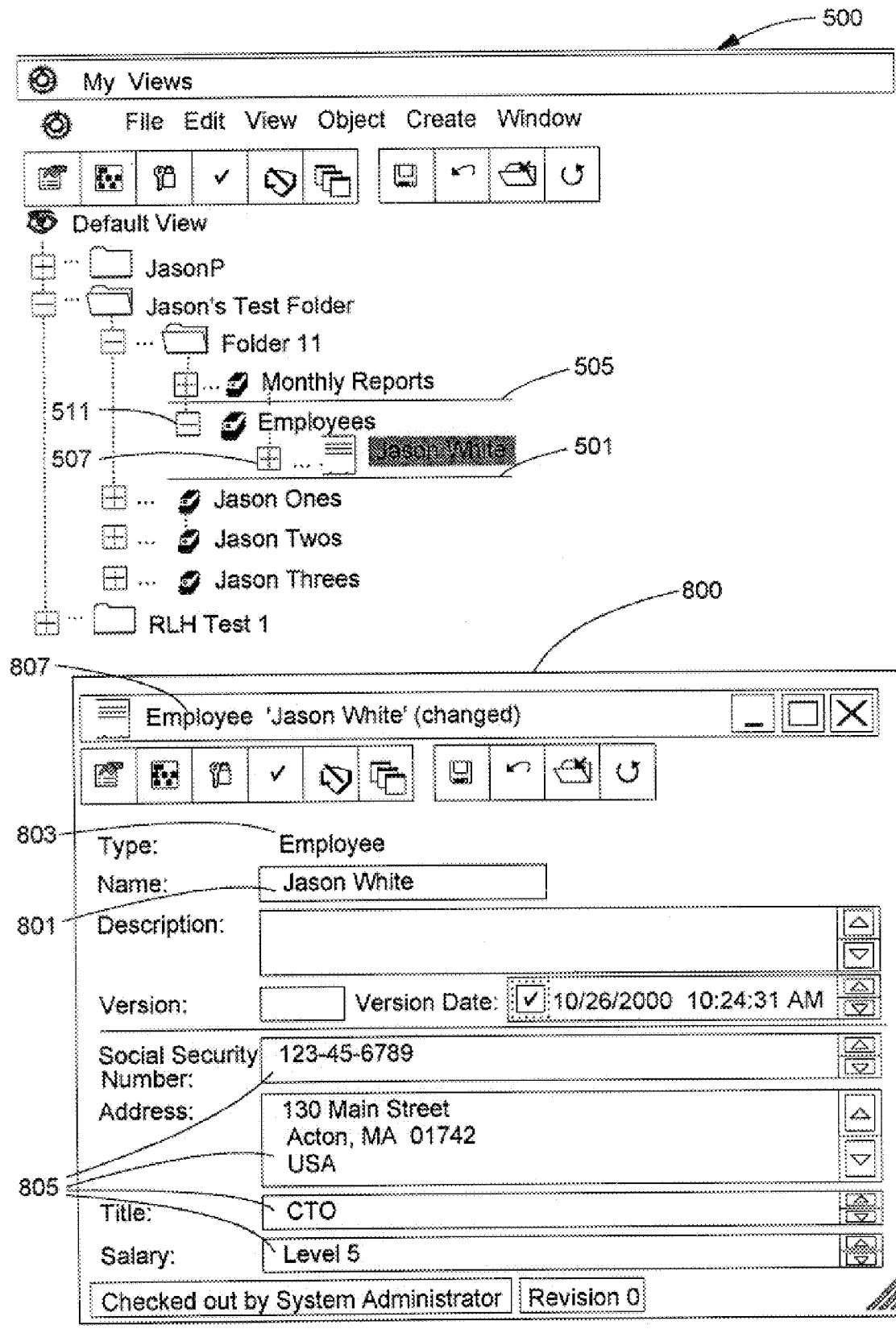
FIGS. 8A and 8B illustrate an exemplary graphical user interface (and invocation of this graphical user interface) that enables a user to create and update an object.
Figure 8B:
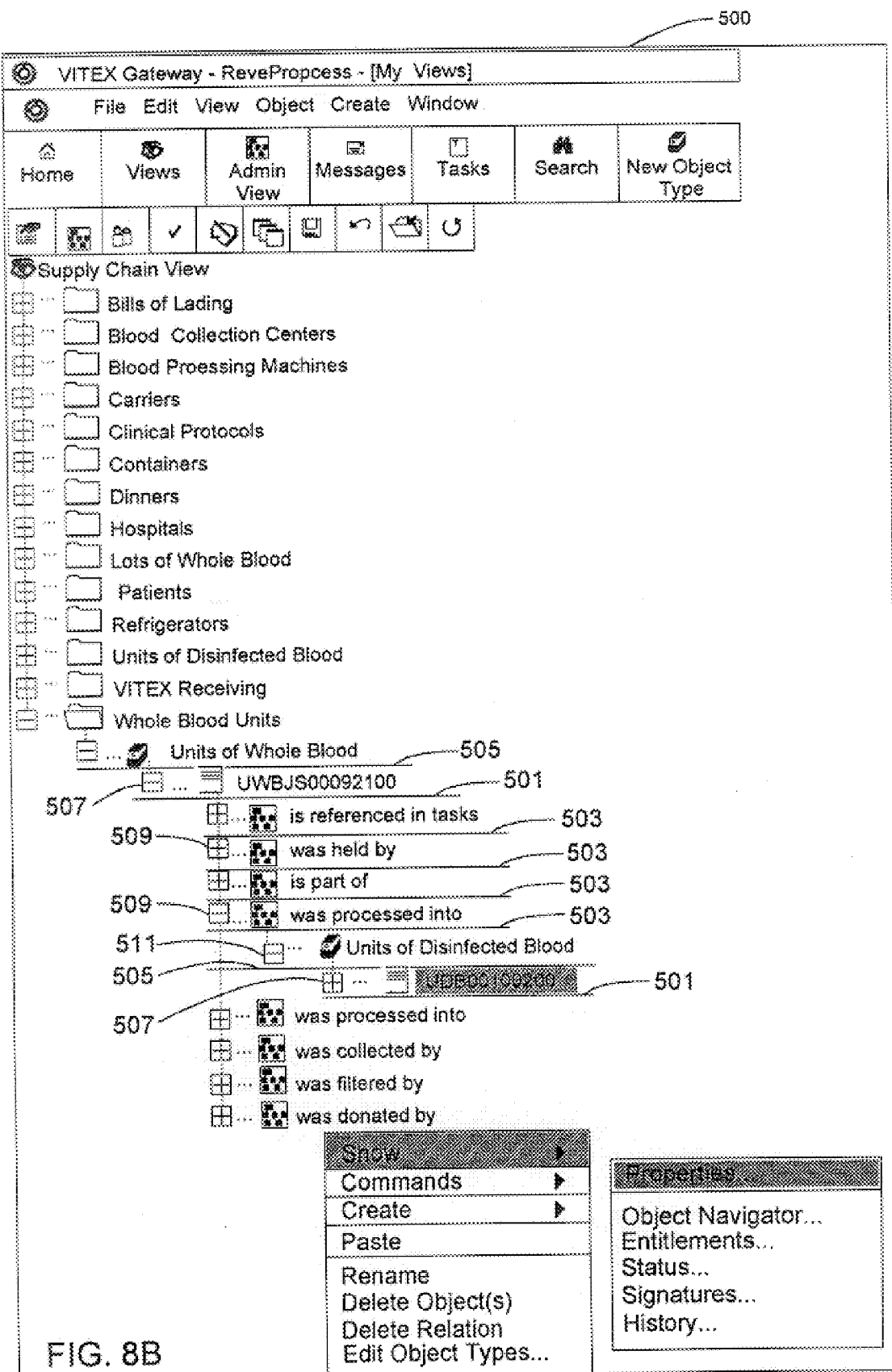

FIG. 8A illustrates an exemplary graphical user interface (GUI) 800 that enables a user to create and update an object. The GUI 800 includes an input frame 801 for inputting an object name (e.g., a text string representing the name of the object), a frame 803 for displaying the name of the object type specified for the object, and a set of input frames 805 for inputting values of a set of attributes (properties) of the object. Preferably, the title bar 807 of the window of the GUI 800 utilizes the singular type name from the object type specified in frame 803. Moreover, the object type for the object is preferably specified (e.g. fixed) via user interaction associated with a type node in the view window 500) prior to invoking GUI 800 or through other user interaction operations. Moreover, the GUI 800 is preferably invoked through user interaction with pull down menus associated with the view window 500 of the view mechanism of FIGS. 5A and 5B and/or through user interaction with the corresponding object node of the view window 500 as illustrated in FIG. 8B, or other user interaction operations.

Figure 9:
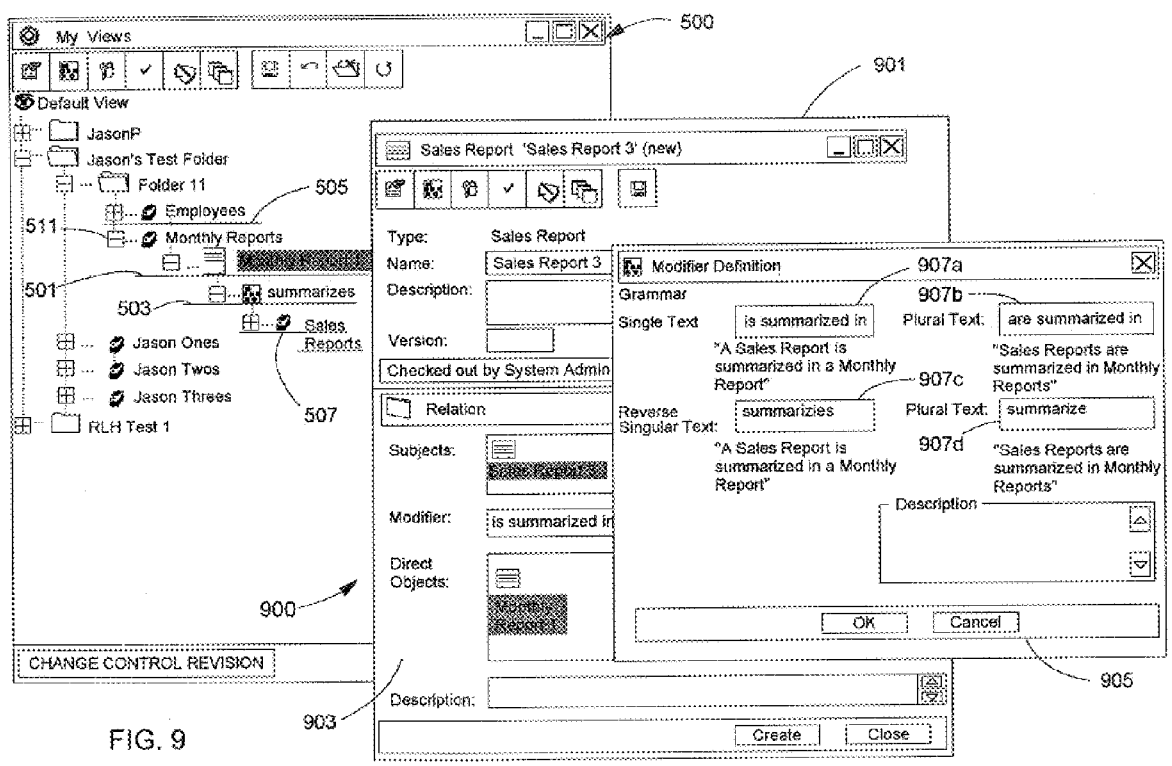
FIG. 9 illustrates an exemplary graphical user interface for creating and updating a relation between objects (e.g., a relation between one or more subject objects and one or more direct objects) according to the present invention.

FIG. 9 illustrates an exemplary graphical user interface (GUI) 900 for creating and updating a relation between objects (e.g., a relation between one or more subject objects and one or more direct objects). The GUI 900 preferably includes a first window 901 that enables a user to create (or specify) an object (in this example, the object "Sales Report 3") as the subject object of the relation. Preferably, the first window 901 is invoked via user interaction with the view window 500. In addition, the GUI includes a second window 903 that enables a user to specify one or more direct objects (in this example, the object "Monthly Report 1" is specified) and specify the bi-directional modifier text representing the relation between the specified subject object (e.g., "Sales Report 3") and the specified direct object(s) (e.g., "Monthly Report 1"). In addition, the GUI 900 includes a third window 905 that enables a user to input arbitrary text strings for creating (or updating) the bi-directional text representing the relation between subject object(s) and direct object(s). Note that the third window 905 includes an input frame 907*a* for inputting the first singular text of a relation (i.e., text that characterizes the semantics of the relationship of a singular subject object to one or more direct objects of a relation), an input frame 907*b* for inputting the first plural text of a relation (i.e., text that characterizes the semantics of the relationship of a plurality of subject objects to one or more direct objects of a relation), an input frame 907*c* for inputting the second singular text of a relation (i.e., text that characterizes the semantics of the relationship of a singular direct object to one or more subject objects of a relation), and an input frame 907d for inputting the second plural text of a relation (i.e., text that characterizes the semantics of the relationship of a plurality of direct objects to one or more subject object of a relation).

Illustrative Embodiments of the Architecture of the Software Application for Creating, Updating, Storing and Querying the Object Data Model According to the Present Invention FIG. 10A shows the primary components of an illustrative embodiment of the database system 1000 of the present invention, namely: one or more client machines (two shown as 1001-1 and 1001-2) that interface to a database management system 1003 over a network. The database management system 1003 includes a data store 1005 that stores the object data model (for example, including the object table, relation object table, relation table, modifier table, object type table, and relation type table) representing object types and objects, relations between objects and object types, and the bi-directional modifier text for these relations representing the semantics of these relations. The client machines 1001 include a client-side software application that provides: a graphical user interface for creating and updating the object data model (including object types, objects, relations and modifier text) as described above, and provides the graphical user interface to the view mechanism as described herein in FIGS. 5 and 6.

The client machines 1001 and database management system 1003 communicate with one another using query and data manipulation commands communicated over the network. Preferably, such query and data manipulation commands comply with a standard interface (such as OLDB, XML /SOAP, OLE-DB, ODBC, SQL, API, JDBC, etc.). In support thereof, the database management system 1003 includes support mechanisms including an interface 1007 and command handler 1009. The interface 1007 provides communication of data over these standard interfaces. Such interfaces are well known in the art. The command handler 1009, is operably coupled to the Data Store 1005, performs the query and data manipulation operations encoded by commands received from client machines 1001, and provides the resultant data (if any) to the interface 1007 for communication to the client machines 1001.

Typically, a user interacts with the client-side software application executing on the client machine to generate a query or data manipulation command, that is communicated to the interface 1007 of the database management system 1003, for example over a network as shown. The command handler disintegrates the command, via parsing, into a series of operations, and performs such operations. Data manipulation and query commands typically involve operations that access the Data Store 1005 to add, update or retrieve data elements stored therein. Retrieved data is provided to interface 1007 for return to the requesting client machine 1001.

FIG. 10B shows the primary components of another illustrative embodiment of the database system 1000 of the present invention. In this architecture, the interface 1007', command handler 1009' and data store 1005' are part of a middleware software application that is operably coupled to a plurality of database management systems 1011-1, 1011-2 . . . 1011-N via connections over a network. The database management systems 1011-1, 1011-2 . . . 1011-N (which may operate on disparate platforms) store the objects in local data stores 1013-1, 1013-2 . . . 1013-N associated therewith. The middleware application 1003' stores the object data model of the present invention, which represents the relationships between such objects and the semantics of such relationships, in a local datastore 1005'. In this architecture, the interface 1007' and command handler 1009' operate to interface and access the appropriate database management systems 1011-1,10111-2 . . . 1011-N in response to the processing of query and data manipulation commands issued by the client machines 1001.

In a preferred embodiment of the present invention, the query and data manipulation commands that are used as the interface between the client-side software application and the database management system/middleware application as described above, and the command handler of such systems, support the functionality and methodology with respect to the following functions/methods:

Get Related Modifiers
    input parameter:
        param 1 specifics at least one given object
    returned output:
        output1 is a list of object identifiers (or object names, or the object(s)) corresponding to one ore more related objects that are related to the given object;
        output2 is a list of modifiers (that identify either the first-modifier-text and second-modifier-text, or the text itself) characterizing semantics of one or relation between the given object and the one or more related objects.

Function/Method: Get-Related-Objects-Heterogeneous
    input parameters:
        param1 specifies at least one given object;
        param2 specifies either first-modifier-text or second-modifier-text (or a modifier identifier specifying same) for at least one relation for the given object
    returned output:
        output1 is a list of object identifiers (or object names, or the object(s)) corresponding to one or more related objects that are related to the given object, wherein the semantics of this relation corresponds to the specified first-modifier-text or second-modifier-text (or specified modifier identifier).

Function/Method: Get-Related-Objects-Homogenous
    input parameter:
        param1 specifies at least one given object;
        param2 specifies either first-modifier-text or second-modifier-text (or a modifier identifier specifying same) for at least one relation for the given object;
        param3 specifies at least one object type.
    returned output:
        output1 is a list of object identifiers (or object names, or the object(s)) corresponding to one or more related objects that are related to the given object, wherein the semantics of this relation corresponds to the specified first-modifier-text or second-modifier-text (or the specified modifier identifier), and wherein the type of the related object corresponds to the specified type.

Function/Method: Get Related Objects Types
    input parameter:
        param1 specifies at least one given object; and
        param2 specifies either first-modifier-text or second-modifier-text (or a modifier identifier specifying same) for at least one relation for the given object.
    returned output:
        output1 is a list of object type identifiers (or object type names) of one or more object types having at least one object that is related to the given object, wherein the semantics of this relation corresponds to the specified first-modifier-text or second-modifier-text (or specified modifier identifier).

A more detailed description of exemplary operations that support such functionality with respect to the relational object model of FIG. 4 is set forth above in the pseudo code that embodies these functions/methods.

Advantageously, the data object model of the present invention provides significant improvements over traditional data storage methodologies. More specifically, semantics of relationships between data objects and data types are stored with the data objects and types making it simple to add new relationships and types of relationships. In addition, new data objects and types can be added to the system without modifying the storage structure. Once added, new objects can utilize the existing semantics and can participate in relationships with existing objects.

Moreover, the view/navigation mechanism of the present invention makes the semantic relationships between data objects and data types visible in an easily navigable, natural language format. A user can navigate from data object to another exploring these relationships. In the process, a story is revealed that describes the context of the various data objects and provides insights and audit trails important to the domain these objects represent. Views of relationships between data types provide generalizations of the relationships between data objects in the system. The generations represent the business (rules) of the domain they represent.

In addition, the command handler of the present invention provides a uniform set of functions for querying a data object model that represents the semantic relationships between data objects and data types. This mechanism can be deployed as a self-sustaining data storage and retrieval component of a larger application, which interfaces to it via the command handler. Importantly, the command handler provides the logic necessary to analyze the structure of the model and return pertinent results to user-submitted queries.

It is understood that the systems and methods of the illustrative embodiments described herein above may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the claims to invention appended hereto.

What is claimed is:

1. A database system comprising:
   a datastore storing:
      first data comprising a plurality of items; and
      second data, for each given relation between at least one first item and at least one second item, that: i) represents first text characterizing semantics of the relation of the at least one first item to the at least one second item; and ii) represents second text characterizing semantics of the relation of the at least one second item to the at least one first item;
   a command handler that operates, in response to receiving a first-type query command that specifies at least one given item, to access the datastore to identify i) at least one related item that is related to the given item, and ii) one of the first text and second text characterizing semantics of the relation between the given item and the at least one related item; and returns i) data corresponding to the at least one related item; and ii) data corresponding to the one of the first text and second text characterizing semantics of the relation between the given item and the at least one related item.

2. The database system of claim 1, wherein the returned data identifies the at least one related item and identifies text characterizing semantics of each relation between the given item and the at least one related item.

3. The database system of claim 1, wherein the returned data represents one of the first text and second text characterizing semantics of the relation between the given item and the at least one related item.

4. The database system of claim 1, wherein the command handler operates, in response to receiving a second-type query command that specifies: i) at least one given item, and ii) one of first text and second text for at least one relation for the given item, to access the datastore to identify at least one related item that is related to the given item, wherein the semantics of this relation corresponds to the specified one of the first text and second text; and returns i) data corresponding to the at least one related item.

5. The database system of claim 4, wherein the data returned in response to the second-type query identifies the at least one related item.

6. The database system of claim 4, wherein the command handler operates, in response to receiving a third-type query command that specifies: i) at least one given item, ii) one of first text and second text for at least one relation for the given item, and iii) at least one type, to access the datastore to identify at least one related item that is related to the given item, wherein the semantics of this relation corresponds to the specified one of the first text and second text; and wherein the type of the related item corresponds to the specified type, and returns data corresponding to the at least one related item.

7. The database system of claim 6, wherein the data returned in response to the third-type query identifies the at least one related item.

8. The database system of claim 4, wherein the command handler operates, in response to receiving a third-type query command that specifies: i) at least one given item, and ii) one of first text and second text for at least one relation for the given item, to access the datastore to identify at least one type having a related item that is related to the given item, wherein the semantics of this relation corresponds to the specified one of the first text and second text, and returns data corresponding to the at least one type.

9. The database system of claim 8, wherein the data returned in response to the third-type query identifies the at least one type.

10. The database system of claim 1, wherein the first text includes first singular text characterizing semantics of a relationship of one first item to at least one second item and first plural text characterizing the semantics of a plurality of first items to at least one second item, and the second text includes second singular text characterizing semantics of a relationship of one second item to at least one first item and second plural text characterizing semantics of a plurality of second items to at least one item.

11. The database system of claim 1, wherein the first data and second data are stored in distinct data records.

12. The database system of claim 1, wherein the first text and second text comprise arbitrary text strings defined by user input.

13. The database system of claim 9, for use as a relational database management system.

14. In a database system comprising a datastore storing first data comprising a plurality of items and second data, for each given relation between at least one first item and at least one second item, that: i) represents first text characterizing semantics of the relation of the at least one first item to the at least one second item; and ii) represents second text characterizing semantics of the relation of the at least one second item to the at least one first item, a mechanism comprising:

a command handler that operates, in response to receiving a first-type query command that specifies at least one given item, to access the datastore to identify i) at least one related item that is related to the given item, and ii) one of the first text and second text characterizing semantics of the relation between the given item and the at least one related item; and returns i) data corresponding to the at least one related item; and ii) data corresponding to the one of the first text and second text characterizing semantics of the relation between the given item and the at least one related item.

15. The mechanism of claim 14, wherein the returned data identifies the at least one related item and identifies text characterizing semantics of each relation between the given item and the at least one related item.

16. The mechanism of claim 14, wherein the returned data represents one of the first text and second text characterizing semantics of the relation between the given item and the at least one related item.

17. The mechanism of claim 14, wherein the command handler operates, in response to receiving a second-type query command that specifies: i) at least one given item, and ii) one of first text and second text for at least one relation for the given item, to access the datastore to identify at least one related item that is related to the given item, wherein the semantics of this relation corresponds to the specified one of the first text and second text; and returns to the user i) data corresponding to the at least one related item.

18. The mechanism of claim 17, wherein the data returned in response to the second-type query identifies the at least one related item.

19. The mechanism of claim 17, wherein the command handler operates, in response to receiving a third-type query command that specifies: i) at least one given item, ii) one of first text and second text for at least one relation for the given item, and iii) at least one type, to access the datastore to identify at least one related item that is related to the given item, wherein the semantics of this relation corresponds to the specified one of the first text and second text; and wherein the type of the related item corresponds to the specified type, and returns data corresponding to the at least one related item.

20. The mechanism of claim 19, wherein the data returned in response to the third-type query identifies the at least one related item.

21. The mechanism of claim 17, wherein the command handler operates, in response to receiving a fourth-type query command that specifies: i) at least one given item, and ii) one of first text and second text for at least one relation for the given item, to access the datastore to identify at least one type having a related item that is related to the given item, wherein the semantics of this relation corresponds to the specified one of the first text and second text, and returns data corresponding to the at least one type.

22. The mechanism of claim 21, wherein the data returned in response to the fourth-type query identifies the at least one type.

23. The mechanism of claim 14, wherein the first text includes first singular text characterizing semantics of a relationship of one first item to at least one second item and first plural text characterizing the semantics of a plurality of first items to at least one second item, and the second text includes second singular text characterizing semantics of a relationship of one second item to at least one first item and second plural text characterizing semantics of a plurality of second items to at least one item.

24. The mechanism of claim 14, wherein the first data and second data are stored in distinct data records.

25. The mechanism of claim 14, wherein the first text and second text comprise arbitrary text strings defined by user input.

26. The mechanism of claim 14, for use in a relational database management system, wherein the data store comprises at least one relational database.

* * * * *

UNITED STATES PATENT AND TRADEMARK OFFICE
CERTIFICATE OF CORRECTION

| | | |
|---|---|---|
| PATENT NO. | : 6,618,732 B1 | Page 1 of 1 |
| DATED | : September 9, 2003 | |
| INVENTOR(S) | : Jason S. White, Rebecca L. Hall and Harold H. Engstrom | |

It is certified that error appears in the above-identified patent and that said Letters Patent is hereby corrected as shown below:

<u>Title page,</u>
Item [*] Notice, insert -- The term of the patent should be extended by 380 days under USC 1.154(b) --

Signed and Sealed this

Thirtieth Day of December, 2003

JAMES E. ROGAN
*Director of the United States Patent and Trademark Office*